US012579955B2

(12) United States Patent
Choi et al.

(10) Patent No.: US 12,579,955 B2
(45) Date of Patent: Mar. 17, 2026

(54) DISPLAY DRIVING DEVICE AND DISPLAY DRIVING METHOD

(71) Applicant: LX SEMICON CO., LTD., Daejeon (KR)

(72) Inventors: Ji Hoon Choi, Daejeon (KR); Ji Hong Yuk, Daejeon (KR); Do Hoon Lee, Daejeon (KR); Ho Hyub Jeon, Daejeon (KR); Seok Hwa Jeong, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/591,500

(22) Filed: Feb. 29, 2024

(65) Prior Publication Data

US 2025/0046271 A1     Feb. 6, 2025

(30) Foreign Application Priority Data

Aug. 2, 2023     (KR) ........................ 10-2023-0101078

(51) Int. Cl.
| | |
|---|---|
| *G09G 5/02* | (2006.01) |
| *G02B 27/01* | (2006.01) |
| *G06T 7/13* | (2017.01) |

(52) U.S. Cl.
CPC ........... *G09G 5/02* (2013.01); *G02B 27/0172* (2013.01); *G06T 7/13* (2017.01); *G09G 2320/0626* (2013.01); *G09G 2320/0666* (2013.01)

(58) Field of Classification Search
CPC .... G09G 5/02; G09G 5/37; G09G 2320/0626; G09G 2320/0666; G09G 2320/0242; G09G 2320/0285; G09G 2300/0452; G09G 2340/0457; G02B 27/0172; G06T 7/13; G06T 5/80
See application file for complete search history.

(56) References Cited

U.S. PATENT DOCUMENTS

| | | |
|---|---|---|
| 2016/0314564 A1 | 10/2016 | Jones et al. |
| 2020/0310128 A1* | 10/2020 | Otsuka ............... G02B 27/0172 |
| 2023/0368744 A1* | 11/2023 | Watanabe ........... G09G 3/2074 |

FOREIGN PATENT DOCUMENTS

WO     2022/163213 A1     8/2022

OTHER PUBLICATIONS

Extended European Search Report dated Aug. 12, 2024 issued in Patent Application No. 24161049.2 (12 pages).

* cited by examiner

*Primary Examiner* — Christopher E Leiby
(74) *Attorney, Agent, or Firm* — POLSINELLI PC

(57) ABSTRACT

A display driving method includes receiving an image; calculating a distance between a current point and a current pixel for a sub-pixel of the image; calculating a weight based on a parameter; and compensating for distortion in the image based on the weight. A color of the sub-pixel may include at least one of red, green, or blue, and the parameter may include at least one of a distance parameter, a distortion parameter, or a sub-pixel parameter.

17 Claims, 23 Drawing Sheets

FIG. 7
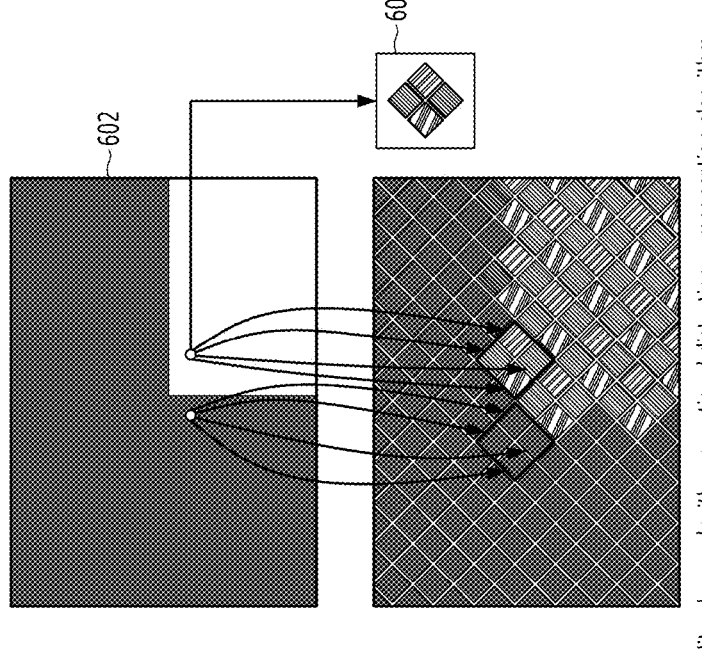
Image quality observed with conventional distortion compensation algorithm
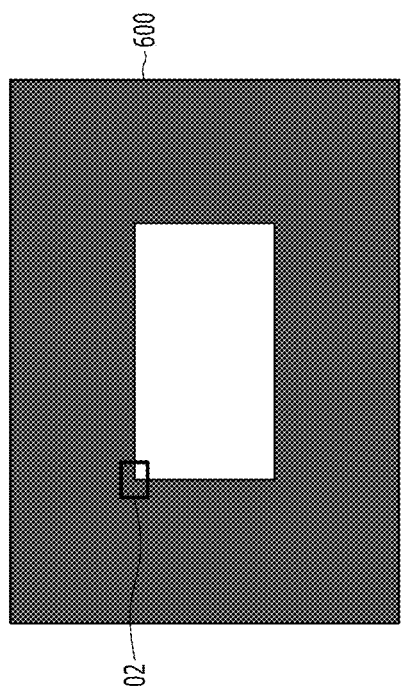

FIG. 8

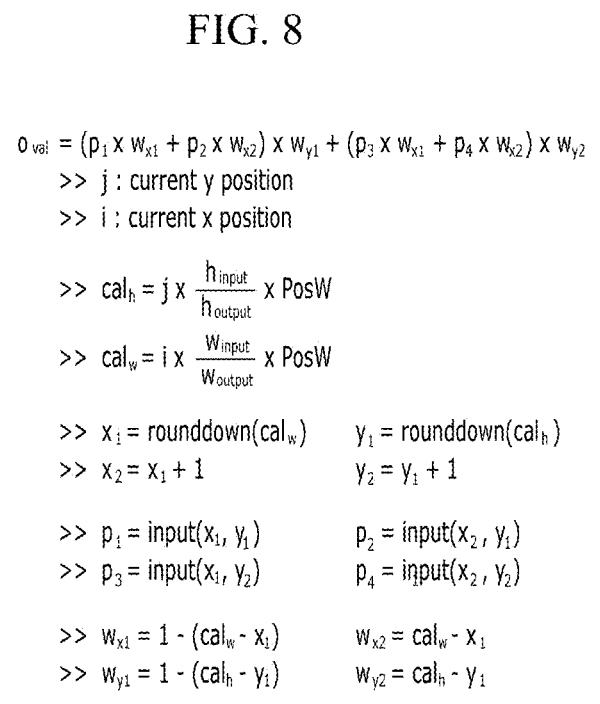

$O_{val} = (p_1 \times w_{x1} + p_2 \times w_{x2}) \times w_{y1} + (p_3 \times w_{x1} + p_4 \times w_{x2}) \times w_{y2}$ >> j : current y position >> i : current x position >> $cal_h = j \times \dfrac{h_{input}}{h_{output}} \times PosW$ >> $cal_w = i \times \dfrac{w_{input}}{w_{output}} \times PosW$ >> $x_1 = \text{rounddown}(cal_w)$     $y_1 = \text{rounddown}(cal_h)$ >> $x_2 = x_1 + 1$          $y_2 = y_1 + 1$ >> $p_1 = \text{input}(x_1, y_1)$     $p_2 = \text{input}(x_2, y_1)$ >> $p_3 = \text{input}(x_1, y_2)$     $p_4 = \text{input}(x_2, y_2)$ >> $w_{x1} = 1 - (cal_w - x_1)$     $w_{x2} = cal_w - x_1$ >> $w_{y1} = 1 - (cal_h - y_1)$     $w_{y2} = cal_h - y_1$

FIG. 9

Image quality observed when distortion compensation is performed based on proposed method

FIG. 10

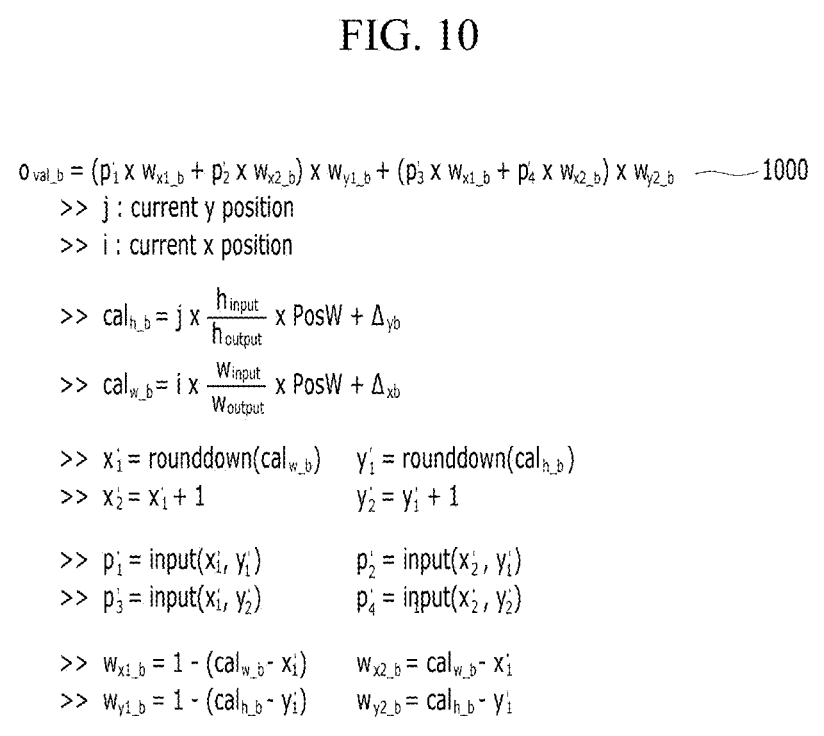

$O_{val\_b} = (p'_1 \times w_{x1\_b} + p'_2 \times w_{x2\_b}) \times w_{y1\_b} + (p'_3 \times w_{x1\_b} + p'_4 \times w_{x2\_b}) \times w_{y2\_b}$ ———1000

$>>$ j : current y position $>>$ i : current x position $>>$ $cal_{h\_b} = j \times \dfrac{h_{input}}{h_{output}} \times PosW + \Delta_{yb}$ $>>$ $cal_{w\_b} = i \times \dfrac{w_{input}}{w_{output}} \times PosW + \Delta_{xb}$ $>>$ $x'_1 = rounddown(cal_{w\_b})$     $y'_1 = rounddown(cal_{h\_b})$ $>>$ $x'_2 = x'_1 + 1$             $y'_2 = y'_1 + 1$ $>>$ $p'_1 = input(x'_1, y'_1)$       $p'_2 = input(x'_2, y'_1)$ $>>$ $p'_3 = input(x'_1, y'_2)$       $p'_4 = input(x'_2, y'_2)$ $>>$ $w_{x1\_b} = 1 - (cal_{w\_b} - x'_1)$     $w_{x2\_b} = cal_{w\_b} - x'_1$ $>>$ $w_{y1\_b} = 1 - (cal_{h\_b} - y'_1)$     $w_{y2\_b} = cal_{h\_b} - y'_1$ Drive layer (silicon semiconductor substrate)
- including driving circuit Receiving image — S1700

Calculating distance between current point and current pixel for sub-pixels of image — S1701

Calculating weights based on parameters — S1702

Compensating for distortion in image based on the weights — S1703 center point (610)
of a distortion
parameter for red center point (620)
of a distortion
parameter for blue Output image when conventional distortion
compensation algorithm is performed Output image when distortion compensation is
performed according to present disclosure

FIG. 21A                           FIG. 21B

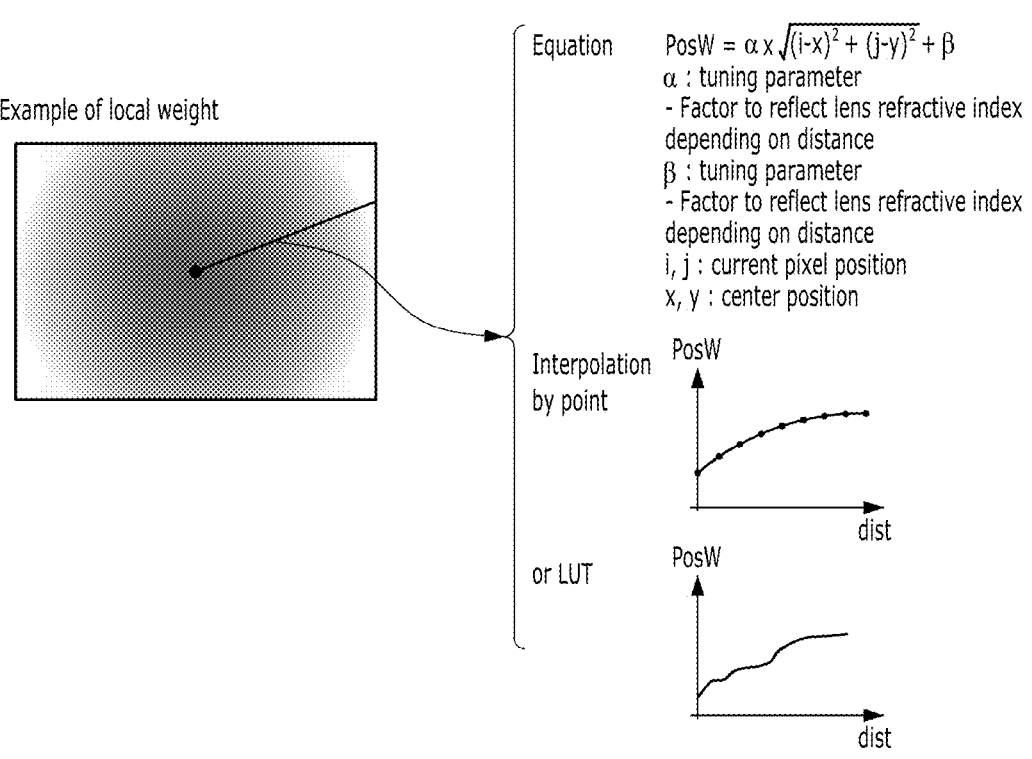

Example of local weight

Equation $$PosW = \alpha \times \sqrt{(i-x)^2 + (j-y)^2} + \beta$$

$\alpha$ : tuning parameter
- Factor to reflect lens refractive index depending on distance
$\beta$ : tuning parameter
- Factor to reflect lens refractive index depending on distance
$i, j$ : current pixel position
$x, y$ : center position Interpolation by point    PosW dist or LUT    PosW dist

DISPLAY DRIVING DEVICE AND DISPLAY DRIVING METHOD

CROSS-REFERENCE TO RELATED APPLICATION

This application claims the priority of Korean Patent Application No. 10-2023-0101078, filed on Aug. 2, 2023, which is hereby incorporated by reference in its entirety.

BACKGROUND

Field of the Disclosure

The present disclosure is related to a display driving device and display driving method.

Description of the Background

During the operations of a display, distortion may occur in a displayed image depending on the characteristics of a lens and/or the characteristics of the image. If the input image is a digital image, chromatic aberration may be corrected during digital image processing. When chromatic aberration correction is performed on a digital image, a resulting image also has discrete features. One drawback of the chromatic aberration correction is the production of unnatural images. Accordingly, there is a need for a display driving method and device for correcting chromatic aberration distortion while compensating for the unnatural appearance of a resulting image.

SUMMARY

Accordingly, the present disclosure is directed to a display driving device and display driving method that substantially obviate one or more problems due to limitations and disadvantages of the related art.

In aspects, there are provided a display method and device for obtaining smooth images from a user perceptual perspective in consideration of the degree of distortion in each lens by reflecting the characteristics of the lens.

In aspects, a low-latency and low-complexity display driving method and device are provided to address distortion in various display devices and lenses and obtain natural images.

However, the present disclosure is not limited to what has been particularly described hereinabove, and the scope of aspects may be expanded to other technical challenges capable of being inferred by those skilled in the art based on the entire disclosure provided.

To achieve these and other advantages and in accordance with the present disclosure, as embodied and broadly described herein, provided is a display driving method according to aspects. The display driving method includes receiving an image; calculating a distance between a current point and a current pixel for a sub-pixel of the image; calculating a weight based on a parameter; and compensating for distortion in the image based on the weight. A color of the sub-pixel may include at least one of red, green, or blue, and the parameter may include at least one of a distance parameter, a distortion parameter, or a sub-pixel parameter.

In another aspect of the present disclosure, a display driving device includes a position calculator configured to receive an image and calculate a distance between a current point and a current pixel for a sub-pixel of the image, a weight calculator configured to calculate a weight based on a parameter; and a distortion correction calculator configured to compensate for distortion in the image based on the weight, wherein a color of the sub-pixel includes at least one of red, green, or blue, and wherein the parameter includes at least one of a distance parameter, a distortion parameter, and a sub-pixel parameter.

In a further aspect of the present disclosure, a virtual reality (VR) device includes a lens; and a display driving device connected to the lens, wherein the display driving device includes a position calculator configured to receive an image and calculate a distance between a current point and a current pixel for a sub-pixel of the image, a weight calculator configured to calculate a weight based on a parameter; and a distortion correction calculator configured to compensate for distortion in the image based on the weight, wherein a color of the sub-pixel includes at least one of red, green, or blue, and wherein the parameter includes at least one of a distance parameter, a distortion parameter, and a sub-pixel parameter.

It is to be understood that both the foregoing general description and the following detailed description of the present disclosure are exemplary and explanatory and are intended to provide further explanation of the disclosure as claimed.

The present disclosure has the following effects.

A display driving method and device according to aspects may efficiently process digital images.

The display driving method and device according to the aspects may provide high-quality and easily recognizable digital images.

The display driving method and device according to the aspects may provide general services including virtual reality (VR) services.

BRIEF DESCRIPTION OF THE DRAWINGS

The accompanying drawings, which are included to provide a further understanding of aspects, illustrate the aspects of the present disclosure and serve to explain the principles of the aspects together with the description. For a better understanding of the various aspects described herein, reference should be made to the following description of the aspects in conjunction with the following drawings in which like reference numerals refer to corresponding parts throughout the figures.

In the drawings:

FIG. 7 illustrates a distortion compensation method according to aspects;

FIG. 8 illustrates a chromatic aberration correction method according to aspects;

FIG. 9 illustrates a distortion compensation method according to aspects;

FIG. 10 illustrates a chromatic aberration compensation method according to aspects;

FIGS. 21A and 21B are diagrams to explain a process for calculating different distortion correction weights in consideration of the distance between the center point and the current pixel according to one aspect of the present disclosure;

DETAILED DESCRIPTION

Hereinafter, various aspects of the present disclosure will be described in detail, examples of which are shown in the attached drawings. The detailed description below with reference to the attached drawings is intended to explain the various aspects of the present disclosure, rather than representing only aspects capable of being implemented according to the present disclosure. The following detailed explanation includes specific details to provide a thorough understanding of the aspects. However, it is evident to those skilled in the art that the aspects are capable of being practiced without these specific details.

Most of the terms used herein are selected from commonly used terms in the relevant field. However, some terms are arbitrarily chosen by the applicant, and the meanings thereof are detailed in the following description as needed. Therefore, the aspects should be understood based on the intended meaning of the terms rather than the names or meanings thereof.

Figures 1A, 1B:
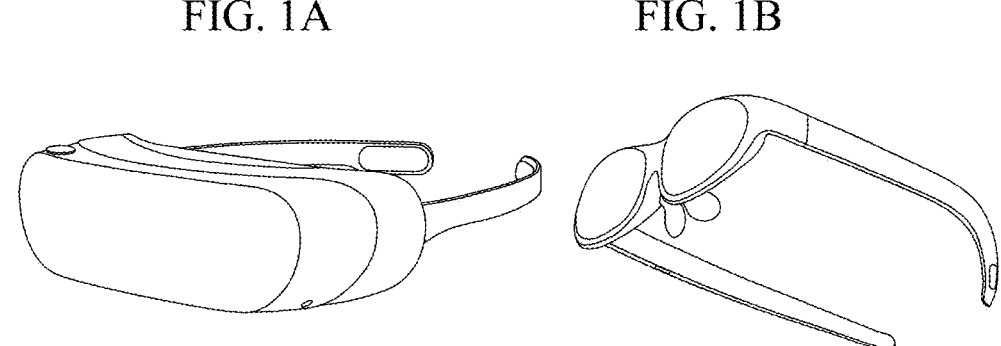
FIGS. 1A and 1B illustrate various appearances of extended reality (XR) devices to which one aspect of the present disclosure is applicable.

FIGS. 1A and 1B illustrate various appearances of extended reality (XR) devices to which one aspect of the present disclosure is applicable.

Virtual reality (VR) refers to a technology that uses virtual images for objects, backgrounds, and environments, all of which are not part of the real world. One of the prominent products used in the VR technology is a head mounted display (HMD) device. When an HMD device is worn on the head, the HMD device has small displays positioned close to both eyes, and thus a three-dimensional (3D) image based on parallax is projected. Users may experience a sense of being in a 3D space through the following features: gyro sensors for tracking user movements; and rendering functions that create images corresponding to these movements. FIG. 1A illustrates the appearance of an exemplary HMD device.

Augmented reality (AR) refers to a technology that overlays 3D virtual images onto real-word images or backgrounds and then displays the overlaid images as a single composite image. One of the prominent products used in the AR technology is AR glasses. The AR glasses are electronic devices in the form of glasses that implement AR content on transparent lenses. While worn like regular glasses, the AR glasses may display images in front of the eyes, much like having a large screen and enable various AR content experiences. Users may experience XR that combines AR content by utilizing all spaces within 360 degrees with respect to the users. FIG. 1B illustrates the appearance of exemplary AR glasses.

Mixed reality (MR) includes AR, which adds virtual information based on reality, and augmented virtuality (AV), which adds real information to a virtual environment. In other words, MR provides a smart environment where reality and virtuality are seamlessly connected, allowing users to have rich experiences.

XR refers to ultra-realistic technologies and services that encompass VR, AR, and MR.

Hereinafter, HMD devices based on the VR technology will be described with reference to FIGS. 1A and 1B, for convenience of explanation. However, the present disclosure is applicable to all types of XR devices.

Figure 2A:
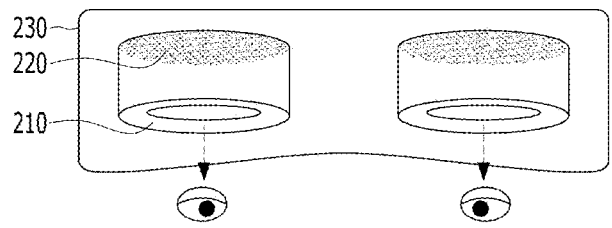
FIGS. 2A, 2B and 2C are perspective views of a head mounted display (HMD) device shown in FIG. 1 from various angles.
Figure 2B:
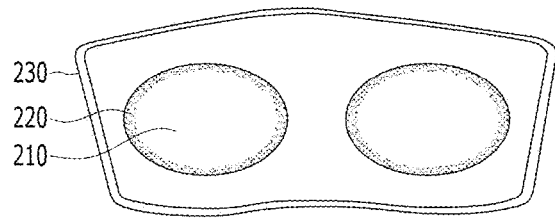
Figure 2C:
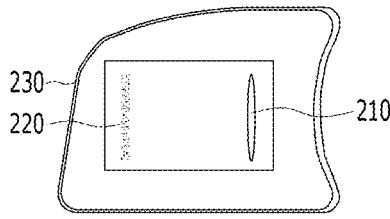

FIGS. 2A, 2B and 2C are perspective views of the HMD device shown in FIG. 1 from various angles.

FIG. 2A is a top perspective view of the HMD device according to one aspect of the present disclosure. Reference number 210 represents a lens, and there are two lenses for the left and right eyes, respectively.

Reference number 220 represents a display. It is within the scope of the present disclosure to produce a configuration with two displays, each displaying left-eye and right-eye images separately or to produce a configuration with a single display.

Reference number 230 represents the HMD device (different types of VR devices also fall within the scope of the present disclosure).

FIG. 2B is a front perspective view of the HMD device according to one aspect of the present disclosure, and FIG. 2C is a side perspective view of the HMD device according to one aspect of the present disclosure.

Figure 3:
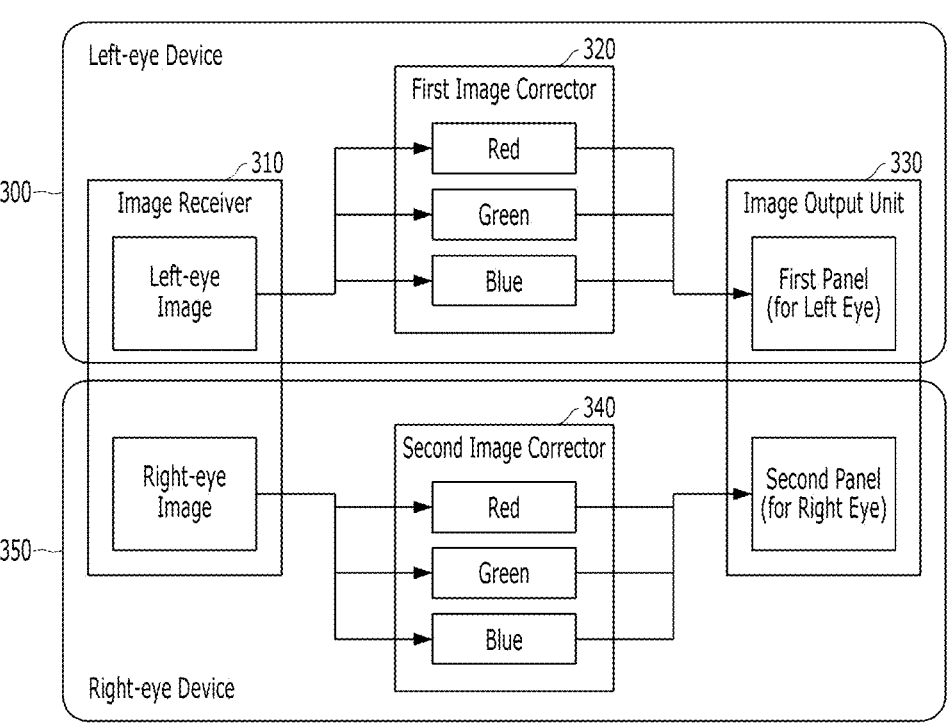
FIG. 3 is a block diagram illustrating main components inside the HMD device shown in FIG. 1.

FIG. 3 is a block diagram illustrating main components in the HMD device shown in FIG. 1.

As shown in FIG. 3, image receivers 310 included in a left-eye device 300 and a right-eye device 350 receive left-eye and right-eye images, respectively.

Due to the visual characteristics of human eyes, an object needs to be observed from different perspectives based on the positions of the two eyes, and images perceived by both eyes may be combined in the brain and perceived as a single image. Therefore, the image receivers 310 are designed to receive images that are appropriate for the left and right eyes, respectively.

A first image corrector 320 included in the left-eye device 300 and a second image corrector 340 included in the right-eye device 350 independently process received images for each of the red (R), green (G), and blue (B) colors. The first image corrector 320 and the second image corrector 340 then deliver the processed images to a left-eye panel and a right-eye panel, respectively. The left-eye panel and the right-eye panel are included in image output units 330, respectively.

Images provided to the left-eye device 300 and the right-eye device 350 are generated by an application processor (AP).

In FIG. 3, the HMD device includes the receiver, corrector, and output unit, but this configuration exists independently for each of the left-eye and right-eye devices. Implementing the receiver, corrector, and output unit as a single form also falls within the scope of the present disclosure.

Figure 4:
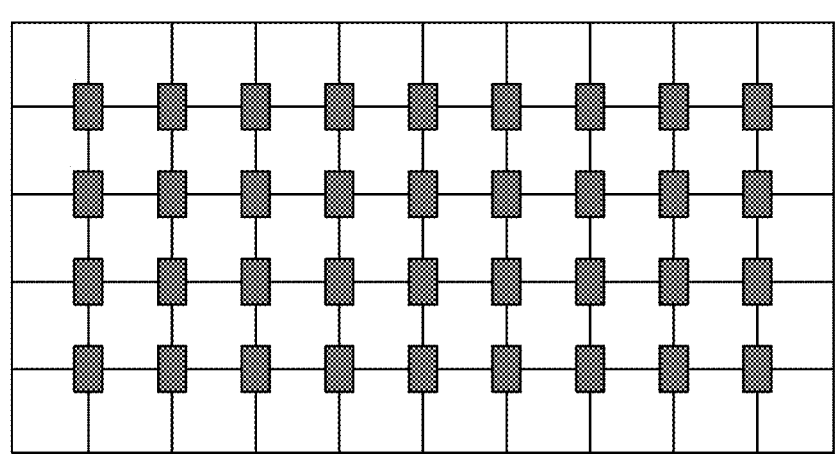
FIG. 4 illustrates an exemplary silicon semiconductor substrate including a driving circuit incorporated into an HMD device.

FIG. 4 illustrates an exemplary silicon semiconductor substrate including a driving circuit incorporated into the HMD device shown in FIG. 1.

Unlike display panels in other products in the prior art, the HMD device according to one aspect of the present disclosure (including other types of VR devices) is designed with a drive layer placed on top of a silicon semiconductor.

When an image is processed, for example, the resolution of R pixels increases while the resolution of B pixels decreases. Therefore, the HMD device is designed such that the HMD device removes some data for the R pixels and fills the B pixels with black to match the resolution of G pixels before outputting video data and then deliver the video data to the drive layer to output the video data.

In some aspects, the resolution of R pixels and/or B pixels may increase. In this case, some data for the R pixels and/or B pixels with increased resolution may be removed.

In some aspects, the resolution of R pixels and/or B pixels may decrease. In this case, the R pixels and/or B pixels with reduced resolution may be filled with black.

Figure 5:
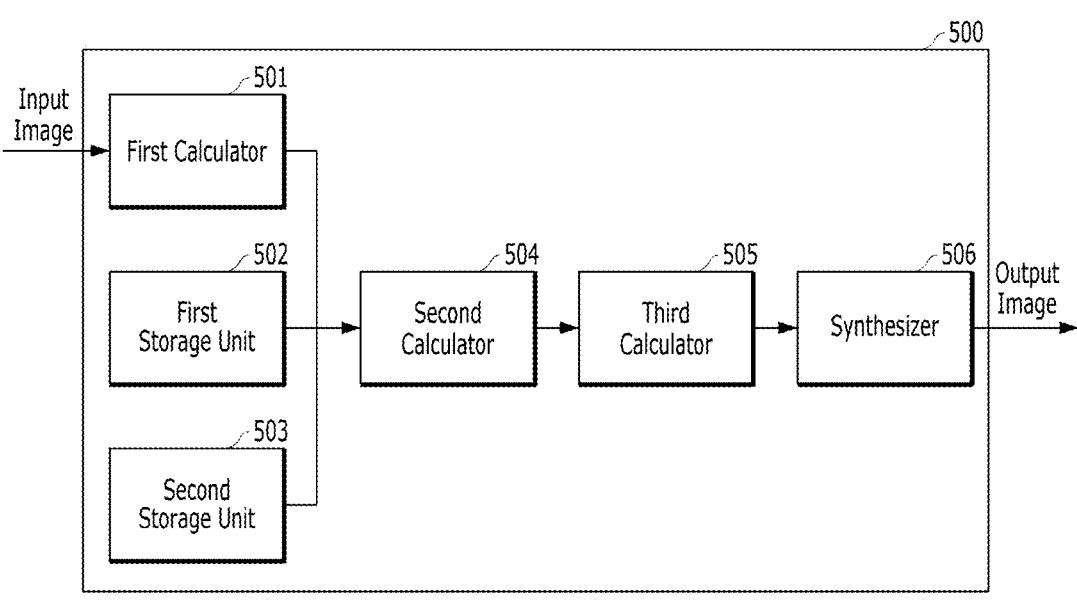
FIG. 5 illustrates the configuration of a display driving device according to aspects.

FIG. 5 illustrates the configuration of a display driving device according to aspects.

Referring to FIG. 5, the display driving device 500 may include: a calculator 501 for calculating a position between the current pixel and the current point; a storage unit 502 for storing a lens distortion parameter; a storage unit 503 for storing a sub-pixel structure parameter; a calculator 504 for calculating a distortion correction weight based on the distance and distortion parameter; a calculator 505 for correcting image distortion; and/or an output image synthesizer 506. The operation of each component is described below. Each component of the display driving device according to the aspects shown in FIG. 5 may correspond to hardware, software, processors, and/or combinations thereof.

The display driving device and method according to the aspects of FIG. 5 may perform and include an image correction method based on the sub-pixel arrangement structure of a display.

The display driving device and method according to the aspects of FIG. 5 may perform and include an algorithm for compensating for color artifacts caused by the sub-pixel structure of a display in devices that provide images to users through special lenses. If the relative positions of sub-pixels within a single pixel, that is, distance information at which the sub-pixels are placed based on the center position of the pixel, are used as parameters in the algorithm for compensating for distortion, color artifacts may be compensated for.

The display driving device 500 may receive an input image and produce an output image for display driving. The input image may be processed into the output image based on operations according to the following aspects.

A first calculator 501 may calculate a position between the current pixel and the current point. The current pixel may represent a pixel included in the input image, and the current point may represent the position of the current point from the center of the display driving device and/or lens. The first calculator may be referred to as a position calculator between the current pixel and the current point.

A first storage unit 502 may store a parameter representing information related to distortion in the display driving device and/or lens connected to the display driving device. The first storage unit (i.e., lens distortion parameter storage unit) 502 may provide the lens distortion parameter for display driving. The first storage unit may be referred to as a lens distortion parameter storage unit.

A second storage unit 503 may store a parameter representing the structure of sub-pixels. The sub-pixels may represent sub-pixels of a pixel of the input image, and one pixel may be composed of sub-pixels. A sub-pixel structure 601 may represent the arrangement of color components, for example, R, G, and B components. In the sub-pixel structure 601 according to aspects, G components may be arranged vertically on the sub-pixel, and R and B components are arranged horizontally on the sub-pixel. The sub-pixel structure may vary for each input image. The display driving method and device according to the aspects may mitigate distortion caused by the sub-pixel structure and efficiently handle chromatic aberration. Hereinafter, detailed operations will be described. The second storage unit may be referred to as a sub-pixel structure parameter storage unit.

A second calculator 504 may calculate a distortion correction weight based on the distortion parameter and/or distance. The second calculator may be referred to as a distortion correction weight calculator based on the distance and distortion parameter.

A third calculator 505 may correct image distortion based on the calculated weight. Image distortion correction will be described later with reference to FIG. 6. The third calculator may be referred to as an image distortion correction calculator.

A synthesizer 506 may synthesize and produce the output image based on a distortion-corrected image. The synthesizer may be referred to as the output image synthesizer.

Figure 6:
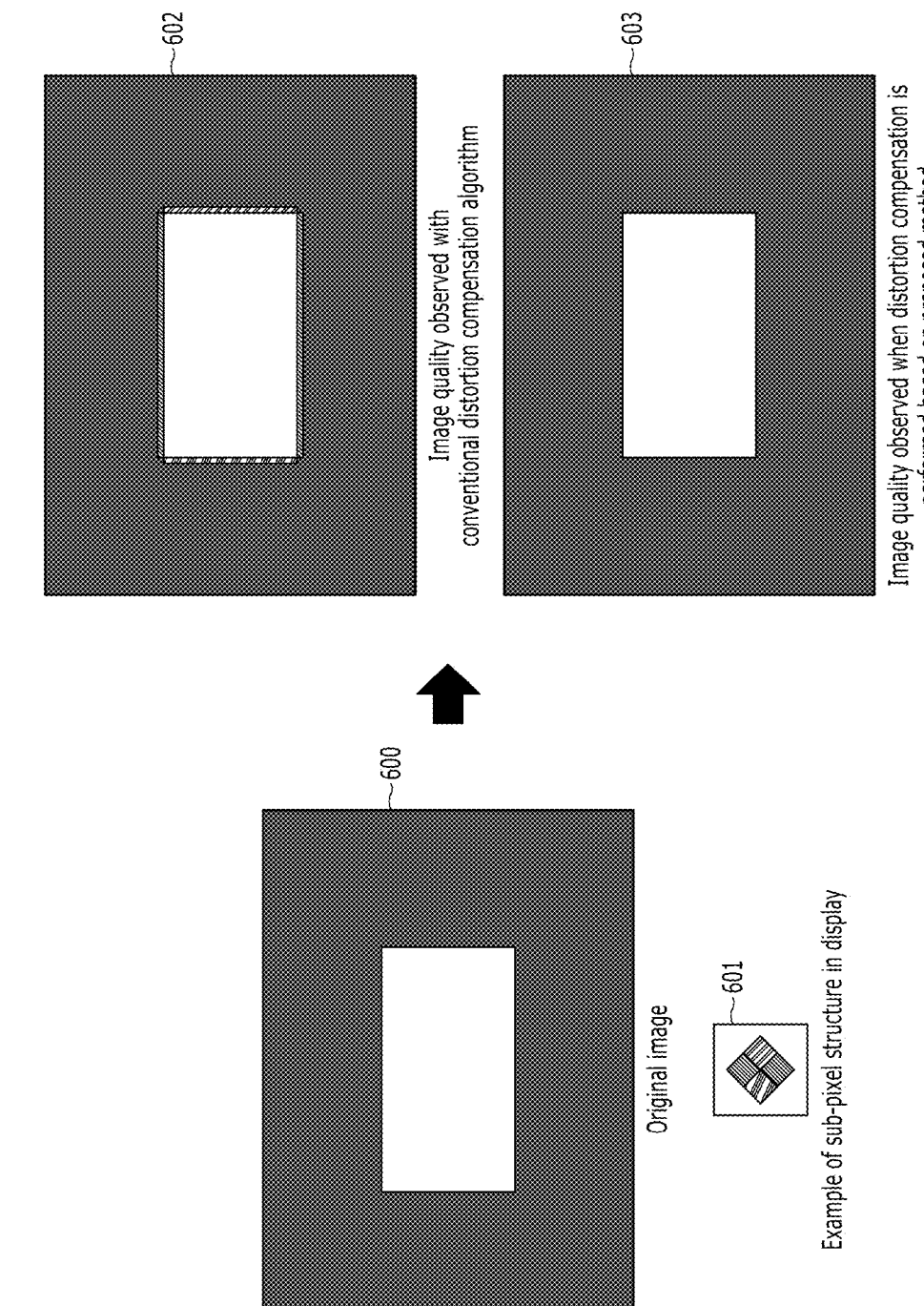
FIG. 6 illustrates exemplary distortion compensation according to aspects.

FIG. 6 illustrates exemplary distortion compensation according to aspects.

The display driving device according to the aspects shown in FIG. 5 may effectively correct image distortion as shown in FIG. 6.

An original image 600 may correspond to the input image in FIG. 5. While the original image 600 passes through lenses for display driving, distortion such as chromatic aberration may occur. The display driving device/method according to the aspects may mitigate the effects of distortion such as chromatic aberration, which is caused by the lens, through preprocessing operations according to aspects before the input image passes through the lens. The original image 600 may include pixels, and the pixels may include sub-pixels. As described above, sub-pixels 601 may have an arrangement (structure, etc.) of color components. Since the arrangement of color components is related to the effects of distortion such as chromatic aberration, the display driving device according to the aspects may perform a method of compensating for distortion by reflecting the sub-pixel structure.

For example, referring to an output image 602, it is observed that chromatic aberration distortion occurs in the output image when the display is driven according to a conventional distortion compensation method. On the other hand, referring to an output image 603, it is observed that when the display is driven according to a distortion compensation method according to aspects, chromatic aberration distortion in the output image is compensated for. Hereinafter, a method by which the display driving device in FIG. 5 performs distortion compensation as shown in FIG. 6 will be described.

FIG. 7 illustrates a distortion compensation method according to aspects.

FIG. 7 shows the chromatic aberration distortion issue described above with reference to FIG. 6. It is observed that when chromatic aberration in an original image 600 is corrected without considering a sub-pixel structure, chromatic aberration distortion also occurs in an output image 602 due to the sub-pixel structure. For example, when G components are biased vertically from the pixel center in a sub-pixel 601 and when R and B components are biased left and right in the sub-pixel 601, respectively, even if distortion compensation is performed on pixels, chromatic aberration may occur in the output image due to the sub-pixel arrangement. The algorithm for the distortion compensation method shown in FIG. 7 will be explained with reference to FIG. 8.

FIG. 8 illustrates a chromatic aberration correction method according to aspects.

The chromatic aberration correction algorithm described above with reference to FIG. 7 is as follows. Chromatic aberration correction may be referred to as distortion compensation.

The display driving method and device according to the aspects may correct chromatic aberration according to the chromatic aberration correction method in FIG. 8. For example, the chromatic aberration correction method may be referred to as local interpolation. Considering the center point of an image, interpolation may be applied with a scale ratio that increases as the distance from the center point increases. Considering the feature of applying scale ratios locally, local interpolation may be referred to as Local Scale Ratio Interpolation. Each variable in the equations shown in FIG. 8 are defined as follows.

Indices i and j represent the pixel coordinates of positions displayed on a panel.

The height of an input image and the height of an output image (h_input, h_output) represent the ratio (resolution ratio) in the vertical direction (height) between the input image and the output image.

The width of an input image and the width of an output image (w_input, w_output) represent the ratio (resolution ratio) in the horizontal direction (width) between the input image and the output image.

A position weight (PosW) represents the weight depending on the distance from the center of an image. The value of the position weight (PosW) may increase or decrease as the distance from the image center increases. The value of the position weight (PosW) may be generated based on the difference in position between the center point and the current pixel.

A height coordinate and a width coordinate (cal_h, cal_w) represent the coordinates of an input image, which are used for referencing R/G/B pixel information related to pixel coordinates i and j.

If the above calculations are performed, the values of the height and width coordinates (cal_h and cal_w) have decimal points.

However, since pixel values are available in integer units in an input image, the pixel brightness level to be displayed on the panel may be estimated based on the brightness levels of four pixels located near the height and width coordinates (cal_h, cal_w).

In this case, x_1, x_2, y_1, and y_2 represent the coordinates of the surrounding pixels, and the brightness levels at the corresponding positions are p_1 to p_4.

The closer the pixels are to the height coordinate (cal_h) and width coordinate (cal_w) to be referenced, the larger the weight values are determined. The weight values are determined as w_x1, w_x2, w_y1, and w_y2 as shown in FIG. 8.

Through the process described above, the brightness level (Oval) of a pixel to be displayed may be estimated.

The chromatic aberration (or distortion) correction method according to the aspects involves: calculating weights for the brightness levels of pixels: p1, p2, p3, and p4, based on the position of the pixels: x1, x2, x3, and x4; and applying the weights to interpolate (estimate) the brightness levels of the pixels. The height coordinate (cal_h) may be referred to as the height, and the width coordinate (cal_w) may be referred to as the width. The output image may be generated by estimating and enhancing the brightness levels of pixels corresponding to the height and width coordinates (cal_h, cal_w). Each of the height and width (cal_h, cal_w) may be generated based on the value of the weight (PosW), which is created based on the distance between the center point and the current pixel, the height ratio between the input image and the output image, the width ratio between the input image and the output image, and the position of the current pixel. The weights: Wx1, Wx2, Wy1, and Wy2 may be calculated for each position based on the height and width (cal_h, cal_w).

Figure 9:
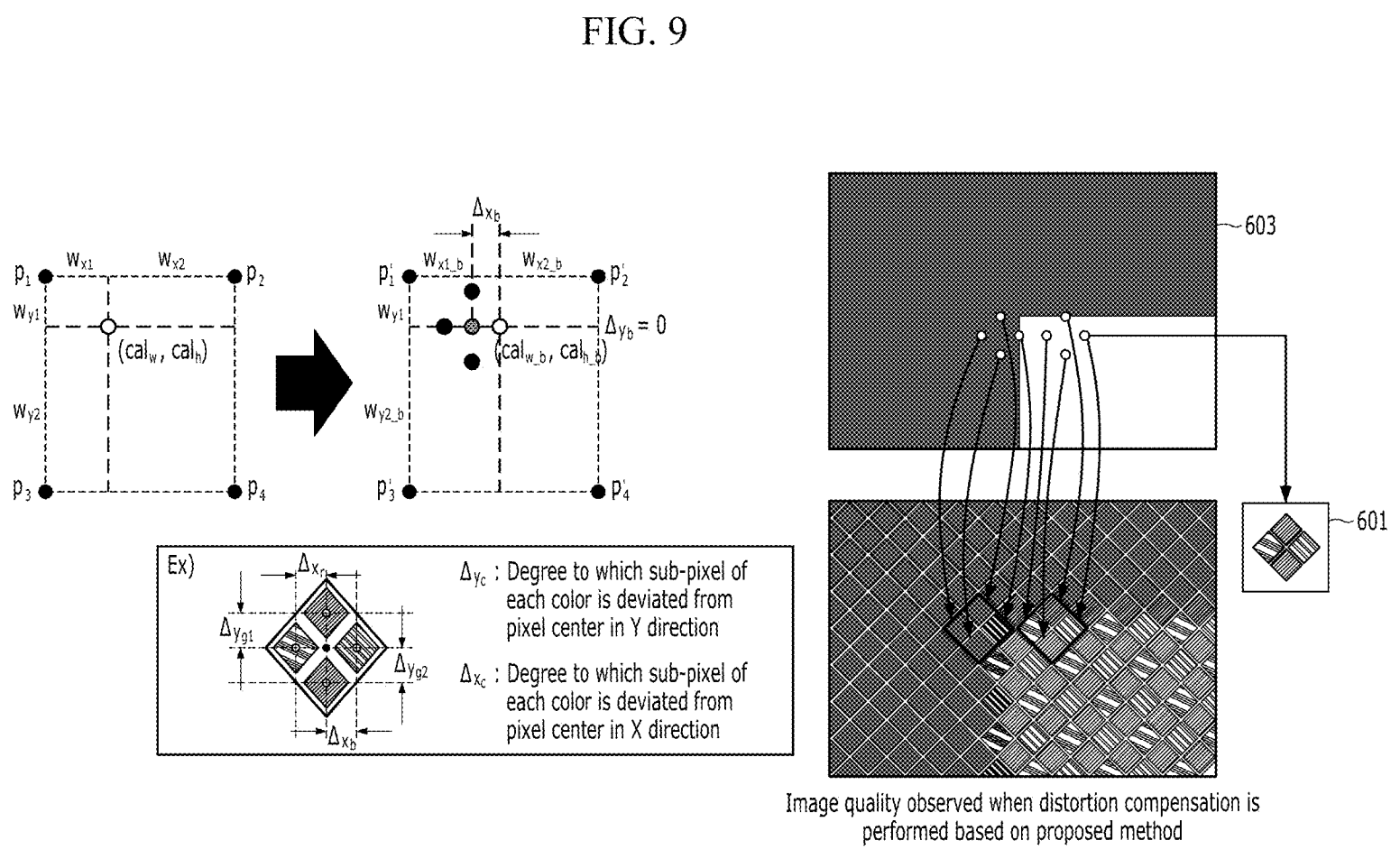

FIG. 9 illustrates a distortion compensation method according to aspects.

Specifically, FIG. 9 shows the distortion compensation method applied to a distortion-compensated image 603 shown in FIG. 6. The image 603 may include sub-pixels 601, and the sub-pixels 601 may have a structure in which color components are arranged uniformly. Compared to an image 602, the chromatic aberration distortion in the image 603 may be mitigated in consideration of the sub-pixel structure.

Since the lens distortion correction method based on local interpolation described above with reference to FIG. 8 is applied equally without distinction for R/G/B colors, the method may have limitations in considering the sub-pixel arrangement structure.

Therefore, assuming the sub-pixel structure shown in FIG. 9 (where there are four sub-pixels for each pixel), the following sub-pixels: R/G1/G2/B need to be positioned at a certain distance or further from the pixel center within a single pixel.

For example, Δ_y_c and Δ_x_c represent information on the degree to which each color of sub-pixel (R, G, B, etc.) is deviated from the pixel center in the Y and X directions, respectively.

In the structure shown in FIG. 9, R and B sub-pixels may be deviated only in the X direction, while G1 and G2 sub-pixels may be deviated only in the Y direction. The sub-pixel structure in FIG. 9 is for illustration purposes, and each sub-pixel may have various shapes.

FIG. 10 illustrates a chromatic aberration compensation method according to aspects.

Specifically, FIG. 10 shows a method 1000 capable of correcting chromatic aberration more accurately in consideration of the structure of sub-pixels, as an aspect of the chromatic aberration correction method of FIG. 8. Chromatic aberration compensation may be referred to as distortion compensation.

The method 1000 that considers the arrangement structure of sub-pixels will be described with reference to FIG. 10, for example, for the B color among a plurality of colors included in the sub-pixel. Various colors such as R, G, and B may be considered. If the degree to which the B sub-pixel is deviated from the pixel center is denoted as $\Delta\_y\_b$ and $\Delta\_x\_b$, these values may be incorporated into conventional height coordinate (cal_h) and width coordinate (cal_w) calculations, and pixel values may be estimated based on the new positions of cal_h_b and cal_w_b. Other equations may be the same as those explained in FIG. 8.

Hereinafter, a comparison of the methods described in FIGS. 8 and 10 is provided. When the interpolation method in FIG. 8 is applied, R/G/B all reference pixel values at the same location, resulting in each sub-pixel having the same brightness and being represented as either black or white in an enlarged image area 602 as shown in FIG. 7. On the other hand, when the method in FIG. 10 is applied, pixel values are referenced in consideration of sub-pixels, that is, by considering the positions where the sub-pixels are actually displayed as shown in FIG. 9. Thus, G sub-pixels referenced at the boundaries may be turned on with lower brightness compared to before, or previously turned-off sub-pixels may be turned on. In other words, chromatic aberration may be corrected by considering the characteristics of each sub-pixel.

In the chromatic aberration (distortion) compensation method according to the aspects, distortion compensation may be performed on sub-pixels in an image, in addition to the operations in FIG. 8. Specifically, chromatic aberration distortion compensation may be carried out for each of the R, G, and B data on the sub-pixels in the image. For example, the sub-pixels may be distributed or arranged based on color data. As shown in FIGS. 9 and 10, among R, B, and G sub-pixels included in a pixel of an image, R and B sub-pixels may be distributed along the x-axis, while G1 and G2 sub-pixels may be distributed along the y-axis. Chromatic aberration may be compensated for by considering color arrangement for each sub-pixel.

For each of the R, G, and B sub-pixels, a weight (PosW) is calculated based on the center point and pixel distance difference. For a given pixel position of (i, j), height and width coordinates (cal_h, cal_w) may be generated in consideration of the height ratio between input and output images, the width ratio between the input and output images, the distance from the sub-pixel to the center of each color of pixel along the x-axis, and the distance from the sub-pixel to the center of each color of pixel along the y-axis.

Based on the height and width (cal_h, cal_w), weights: Wx1, Wx2, Wy1, and Wy2 may be generated for each color of sub-pixel. The decimal points of the height and width (cal_h, cal_w) may be processed by operations such as rounding down or flooring. Two sets of x-axis and y-axis coordinates may be generated with the rounded-down height and width. The pixel brightness of the output image may be interpolated (estimated) based on the pixel brightness of four positions: p'1, p'2, p'3, and p'4. Distortion in the output image may be compensated for based on the generated reference pixel brightness and weights.

Figure 11:
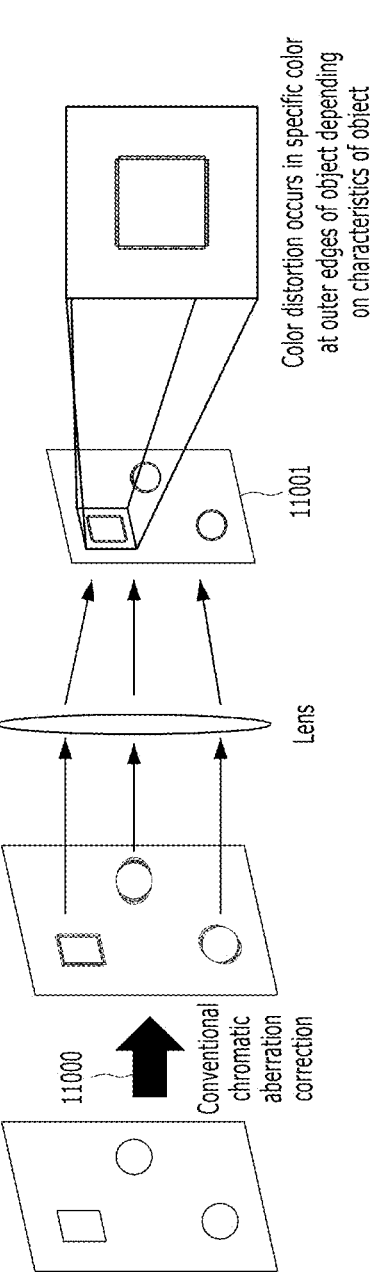
FIG. 11 illustrates chromatic aberration correction results according to aspects.

FIG. 11 illustrates chromatic aberration correction results according to aspects.

FIG. 11 shows the chromatic aberration correction results according to the methods described in FIGS. 7 and 8. A chromatic aberration correction method 11000 is performed as described above with reference to FIGS. 7 and 8, and a final result image 11001 may be provided to the user after passing through lenses connected to a display driving device. Depending on the characteristics of an object, color distortion may occur in specific color(s), for example, at least one of the following color component: R, B, or G at the outer edges of the object.

Figure 12:
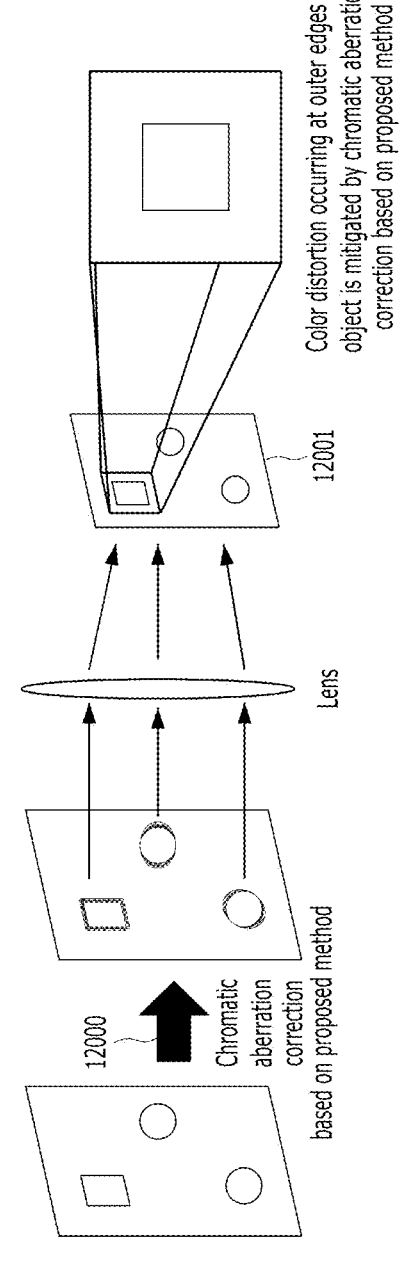
FIG. 12 illustrates chromatic aberration correction results according to aspects.

FIG. 12 illustrates chromatic aberration correction results according to aspects.

FIG. 12 shows the chromatic aberration correction results according to the methods described in FIGS. 9 and 10. A chromatic aberration correction method is performed as described above with reference to FIGS. 9 and 10, and a final result image 12001 may be provided to the user after passing through lenses connected to a display driving device. Compared to FIG. 11, FIG. 12 shows that distortion occurring at the outer edges of an object, for example, chromatic aberration is alleviated or eliminated.

Referring to FIG. 12, the structure of sub-pixels is further considered. Thus, depending on reference positions for vertical boundaries, previously turned-off B sub-pixels may be turned on with lower brightness, or the brightness of previously turned-on R sub-pixels may decrease.

Figure 13:
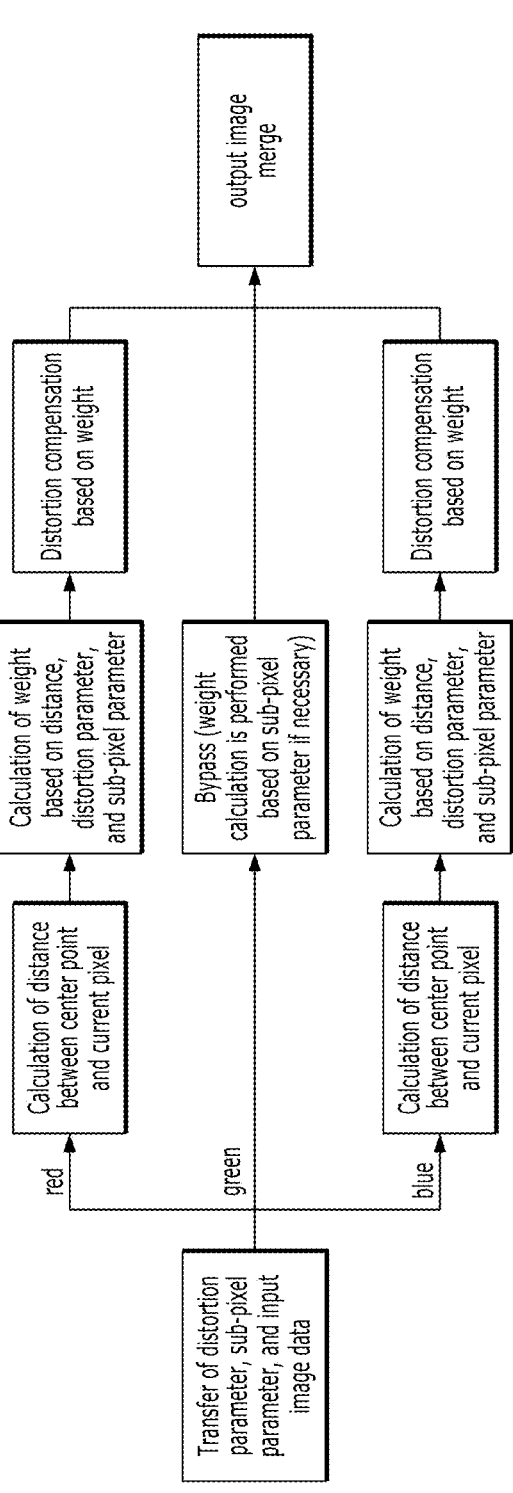
FIG. 13 illustrates distortion compensation according to aspects.

FIG. 13 illustrates distortion compensation according to aspects.

FIG. 13 shows a distortion compensation method based on the chromatic aberration correction method of FIG. 10. In some aspects, chromatic aberration correction may be referred to as distortion compensation.

The operational flow of the display driving device 500 in FIG. 5 may be configured as shown in FIG. 13. For example, the position calculator 501, parameter storage units 502 and 503, weight calculator 504, correction calculator 505, and output image synthesizer 506 may perform each of the operations shown in FIG. 13.

The display driving device according to aspects may receive distortion and/or sub-pixel parameters as well as input image data. The display driving device may also receive distortion and/or sub-pixel parameters that represent the characteristics of a lens used to process the input image.

The distortion compensation method may include operations for each color component. For example, the distortion compensation method may include separate passes for each of the R, G, and B colors.

For the R color, the distortion compensation method according to the aspects may calculate the distance between the center point and the current pixel. The distortion compensation method may calculate the distance between the center point position of the lens and the position of the current pixel of the input image data. The distortion compensation method may calculate a weight based on the distance, distortion, and sub-pixel parameters. Specifically, the distortion compensation method may calculate the weight applied for chromatic aberration or distortion compensation as shown in FIGS. 8 and 10. The distortion compensation method may compensate for distortion based on the calculated weight.

For the G color, bypassing may be performed without performing separate operations for G components. According to aspects, if necessary, a weight may be calculated based on the sub-pixel parameter, and compensation may be performed.

For the B color, the distortion compensation method according to the aspects may calculate the distance between the center point and the current pixel, similarly to the R color. The distortion compensation method may calculate the distance between the center point position of the lens and the current position of the pixel of the input image data. The distortion compensation method may calculate a weight based on the distance, distortion, and sub-pixel parameters. Specifically, the distortion compensation method may calculate the weight applied for chromatic aberration or distortion compensation as shown in FIGS. 8 and 10. The distortion compensation method may compensate for distortion based on the calculated weight.

Different operations may be applied for each color component because the degree of chromatic aberration or distortion perceived by the user's eyes may vary for each color component. Therefore, depending on the display operating environment and/or the characteristics of the input image, the paths for R/G/B may be the same as those in FIG. 13. Alternatively, for the G color, a weight per component may be calculated without bypassing. For the R or B color, bypassing may be performed.

Figure 14:
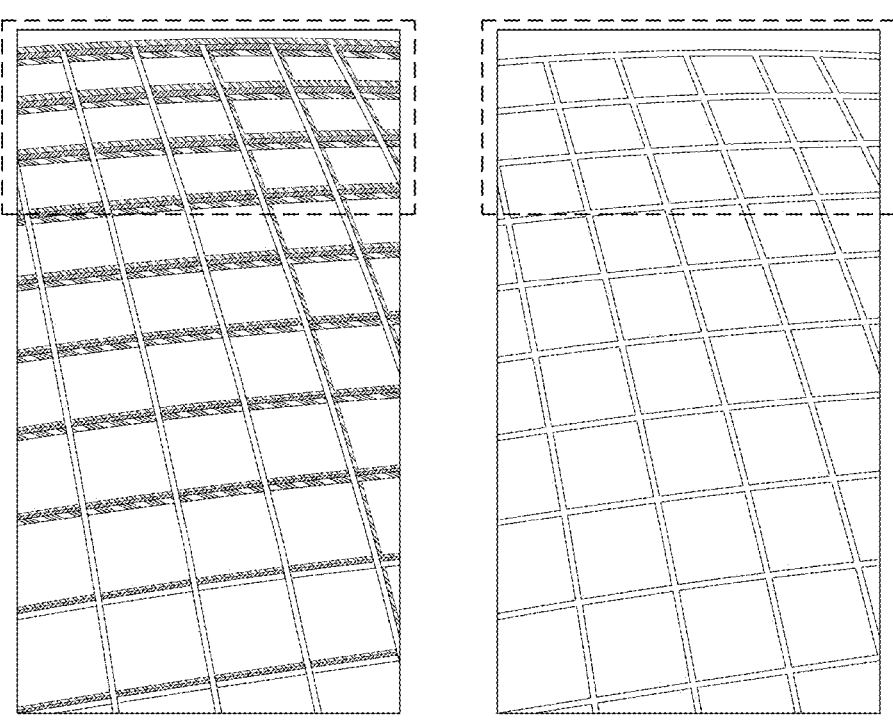
FIG. 14 illustrates distortion compensation effects according to aspects.

FIG. 14 illustrates distortion compensation effects according to aspects.

When distortion compensation is performed according to the above-described methods, it is possible to obtain an output image where chromatic aberration and/or edge distortion is compensated for. It is observed that chromatic aberration and/or edge distortion is alleviated in edge areas. In other words, it is observed that distortion such as color fringing is mitigated.

Figure 15:
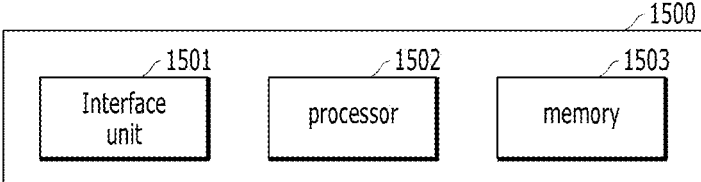
FIG. 15 illustrates a display driving device according to aspects.

FIG. 15 illustrates a display driving device according to aspects.

The display driving devices of FIGS. 3 and 5 may be implemented as the device 1500 shown in FIG. 15.

The display driving device 1500 may include an interface unit 1501, a processor 1502, and/or a memory 1503. Each component shown in FIG. 15 may correspond to hardware, software, processors, and/or combinations thereof.

The interface unit 1501 may receive data required for the device and perform communication within the device. The interface unit 1501 may also receive and transmit information related to image analysis, lens distortion parameter analysis, and so on.

The processor 1502 may be connected to the interface unit 1501 and memory 1503 and perform chromatic aberration compensation and/or edge compensation as described above with reference to FIGS. 7 to 13. The processor may control and execute the operations of each component shown in FIGS. 3 and 5.

The memory 1503 may be connected to the processor, store information required for the chromatic aberration compensation and/or edge compensation, and transmit the information to the processor.

Figure 16:
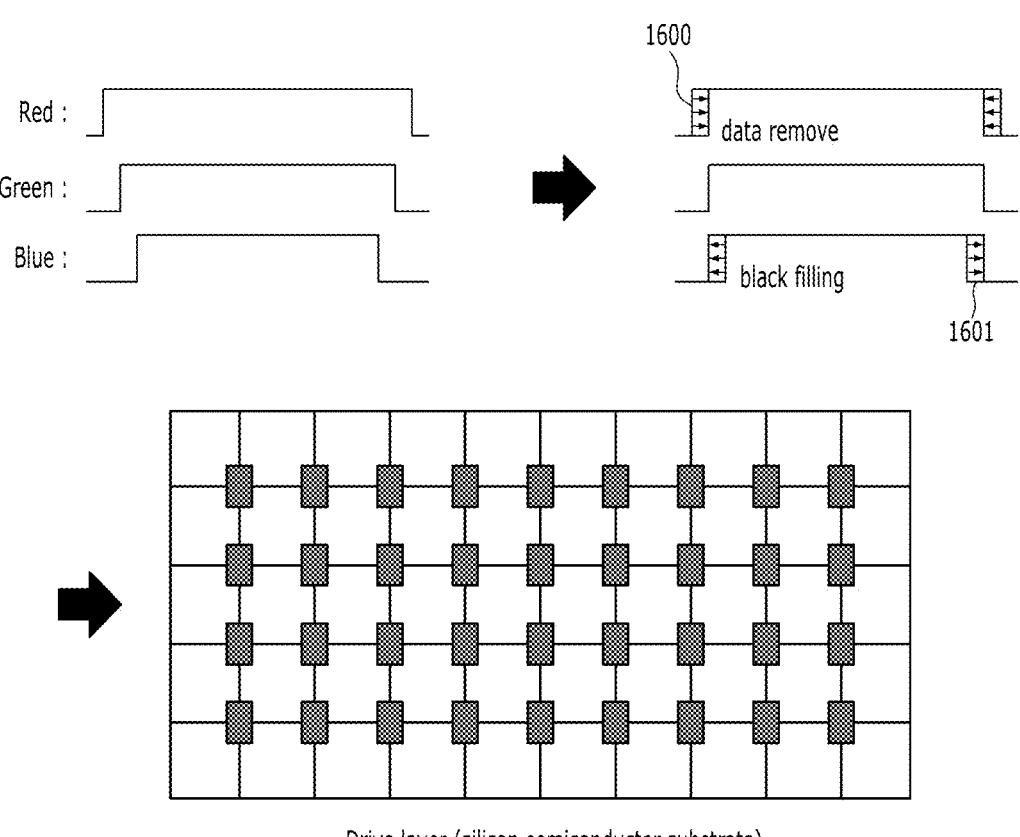
FIG. 16 illustrates device panels according to aspects.

FIG. 16 illustrates device panels according to aspects.

Unlike conventional panels, VR devices have a drive layer on top of a silicon semiconductor. As described above, when an image is corrected, the resolution of R pixels increases while the resolution of B pixels decreases. Before outputting the image, data is removed from the R pixels (1600), and the B pixels are filled with black (1601). Then, overall data is delivered to the driver layer and output.

Referring to the configuration of the device of FIG. 3 such as the VR device, the device according to aspects may include lenses. An image output from a display may pass through the lenses and be delivered to the user's eyes. In other words, the display driving device may mitigate and eliminate errors that may occur while the image passes through the lenses due to the characteristics of the lenses.

Figure 17:
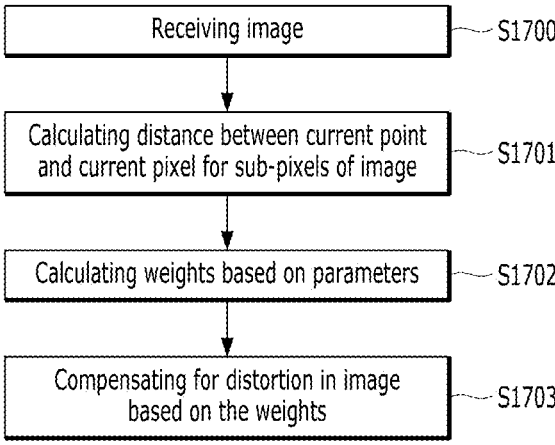
FIG. 17 illustrates a display driving method according to aspects.

FIG. 17 illustrates a display driving method according to aspects.

The display driving method according to aspects may include receiving an image (S1700). The image may be received in the same way as described above in FIGS. 3 and 5.

The display driving method according to the aspects may further include calculating the distance between the current point and the current pixel for sub-pixels of the image (S1701). The distance may be calculated in the same way as described above in FIG. 3, FIG. 5, FIG. 8, FIG. 10, and FIG. 13.

The display driving method according to the aspects may further include calculating a weight based on parameters (S1702). In this case, the weight may be calculated in the same way as described above in FIGS. 7 to 13.

The display driving method according to the aspects may further include compensating for distortion in the image based on the weight (S1703). The distortion may be compensated in the same way as described above in FIGS. 5 to 13.

Figure 18:
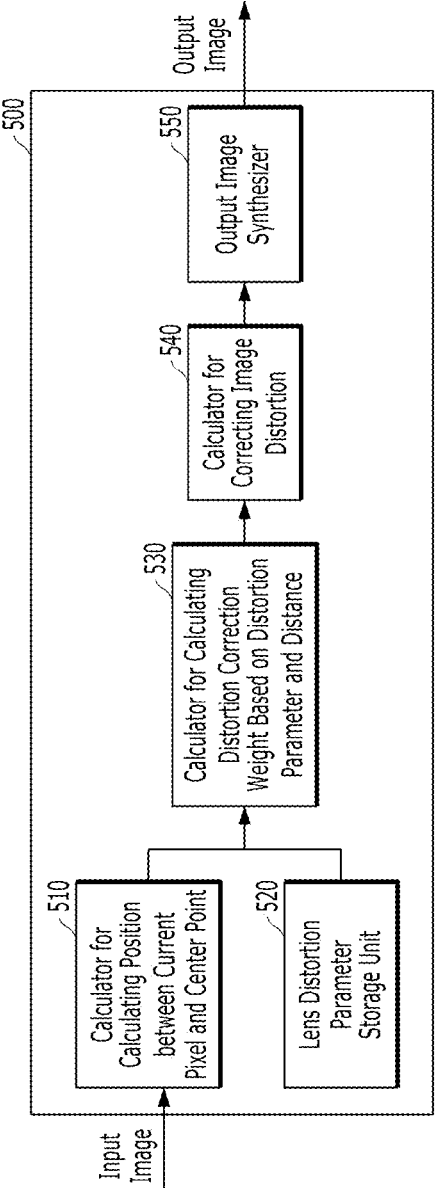
FIG. 18 is a block diagram of a device that provides virtual reality (VR) services according to one aspect of the present disclosure.

FIG. 18 is a block diagram of a device that provides VR services according to one aspect of the present disclosure.

The aspects described above with reference to FIGS. 1 to 17 may be referenced to provide supplemental explanation for FIG. 18.

In particular, products to which the present disclosure is applied allow users to view image data through lenses 210 shown in FIG. 2, which leads to the occurrence of chromatic aberration. Accordingly, the present disclosure aims to address such chromatic aberration issues.

A device 500 in FIG. 18 may correspond to the device 500 in FIG. 5. For example, the device in FIG. 5 may further include the device in FIG. 18, i.e., components 510 to 540 for chromatic aberration compensation. In other words, the device/method according to the aspects may perform both chromatic aberration correction and distortion correction.

As described above, the present disclosure may provide an algorithm for compensating for distortion caused by a lens distortion parameter in devices (e.g., VR devices such as HMDs) that provide images to users through special lenses. To this end, the algorithm is designed to perform compensation by reflecting the distortion parameter, which depends on the distance between the current pixel position and the center point position with respect to the center point of the lens distortion parameter.

For example, as shown in FIG. 18, the device 500 that provides VR services includes a calculator 510 for calculating a position between the current pixel and the center point, a storage unit 520 for storing the lens distortion parameter, a calculator 530 for calculating a distortion correction weight based on the distance and distortion parameter, a calculator 540 for correcting image distortion, and an output image synthesizer 550.

Except for the storage unit 520, the calculator 510 for calculating the position between the current pixel and the center point, the calculator 530 for calculating the distortion correction weight based on the distance and distortion parameter, the calculator 540 for correcting the image distortion, and the output image synthesizer 550 may also be designed to be performed by a single controller, processor, AP, or the like. Such a design also falls within the scope of the present disclosure.

On the other hand, the above-described components: components 510, 530, 540, and 550 may be designed to be controlled by a display driver IC (DDI) rather than an AP. Such a design provides an additional effect of lowering power consumption to about 50%, i.e., up to 50 mW, compared to about 100 mW, which is the power consumed by the AP.

The lens distortion parameter storage unit 520 stores the lens distortion parameter for chromatic aberration correction. The storage unit 520 may be implemented in various forms of memory.

The calculator 510 for calculating the position between the current pixel and the center point receives original image data and initially calculates the distance between the center point and the current pixel.

The calculator 530 for calculating the distortion correction weight based on the distance and distortion parameter is designed to secondarily calculate the distortion correction weight by considering the above-mentioned distance.

The calculator 540 for correcting the image distortion is designed to perform image distortion correction based on the calculated distortion correction weight, without using the lens distortion parameter stored in the storage unit 520, unlike the prior art.

The output image synthesizer 550 combines the corrected image data and output the combined data. However, the output image synthesizer 550 may be designed to perform correction for R and B pixels without performing correction for G pixels. Additionally, the G pixels may be corrected in consideration of the arrangement of sub-pixels.

In other words, according to one aspect of the present disclosure, the distortion correction weight that varies depending on the distance between the center point and the current pixel may be employed, instead of using the lens distortion parameter stored in the memory, thereby addressing chromatic aberration issues at the outer edges of the image. Such functionality may be performed by a controller such as an AP.

In particular, the controller is designed, for example, to increase the distortion correction weight as the distance between the center point and the current pixel increases.

There are no specific constraints on obtaining multiple distortion correction weights. The distortion correction weights may be acquired, for example, based on an interpolation technique or a lookup table (LUT).

On the other hand, the modules (components) 510 and 530 may be designed to be selectively and temporarily disabled when the current pixel corresponds to the G pixel. Therefore, an additional technical advantage of minimizing unnecessary power consumption may be expected.

On the other hand, the modules (components) 510 and 530 may be designed to operate normally when the current pixel corresponds to the R or B pixel.

Therefore, the above-described center point corresponds to, for example, the center point of the distortion parameter for R pixels or the center point of the distortion parameter for B pixels.

Figures 19A, 19B, 19C:
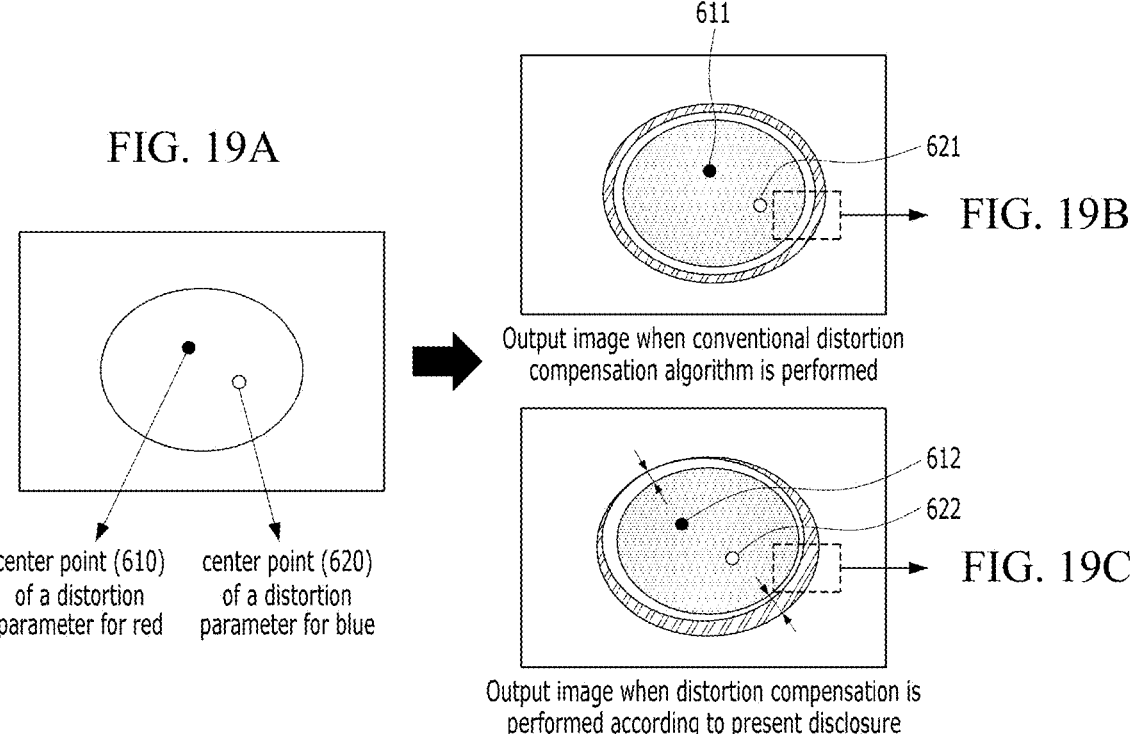
FIGS. 19A, 19B and 19C illustrate results of a distortion compensation algorithm according to one aspect of the present disclosure.

FIGS. 19A, 19B and 19C illustrate results of a distortion compensation algorithm according to one aspect of the present disclosure.

As described above, the G pixel may be designed to be bypassed without compensation. Additionally, the G pixel may be corrected in consideration of the arrangement of sub-pixels. One of the features of the present disclosure is that compensation is performed only for the R and B pixels.

As shown in FIG. 19A, reference number 610 corresponds to the center point of the distortion parameter for R pixels, and reference number 620 corresponds to the center point of the distortion parameter for B pixels.

However, when a conventional distortion compensation algorithm is applied, interpolation is performed uniformly based on a scale ratio, without considering the distance between a center point 611 and a current pixel 621 as shown in FIG. 19B. As a result, the chromatic aberration issues frequently remain at the outer edges.

On the other hand, when the distortion compensation algorithm according to one aspect of the present disclosure is applied, interpolation is performed based on scale ratios where different weights are applied as the distance between a center point 612 and a current pixel 622 increases as shown in FIG. 19C. Therefore, the chromatic aberration issues may be addressed even at the outer edges.

In this regard, bilinear interpolation may be modified and applied, which will be explained in more detail with reference to FIG. 20 below. However, with regard to compensation methods according to aspects, interpolation is not limited to bilinear interpolation and may include interpolation equivalent or similar to the bilinear interpolation such as bicubic interpolation. In the following, the bilinear interpolation will be explained.

Figure 20:
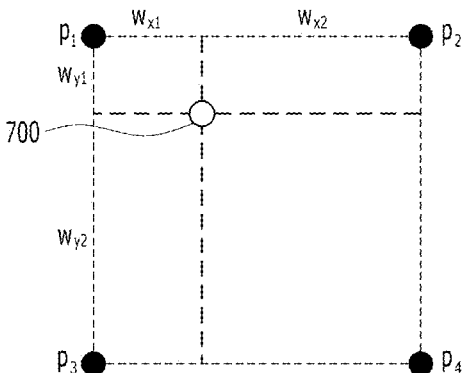
FIG. 20 is a diagram to explain bilinear interpolation according to one aspect of the present disclosure.

FIG. 20 is a diagram to explain bilinear interpolation according to one aspect of the present disclosure.

First, the following equation may be used to implement one aspect of the present disclosure. In particular, a weight (PosW) based on the difference in position (difference in distance) between the center point and the current pixel is additionally used. Further details regarding the weight based on the position difference (distance difference) will be explained in more detail with reference to FIG. 21 below.

$$-O_{val} = (p_1 \times w_{x1} + p_2 \times wx_2) \times w_{y1} + (p_3 \times w_{x1} + p_4 \times w_{x2}) \times w_{y2}$$

$\gg j$: current position $\gg I$: current position $\gg Cal_h = j \times \dfrac{h_{input}}{h_{output}} \times PosW$ $\gg Cal_w = j \times \dfrac{w_{input}}{w_{output}} \times PosW$ $\gg x_1 = \text{rounddown}(cal_w)$ $\gg y_1 = \text{rounddown}(cal_h)$ $\gg x_2 = x_1 + 1$ $\gg y_2 = y_2 + 1$ $\gg p_1 = \text{input}(x_1, y_1)$ $\gg p_2 = \text{input}(x_2, y_1)$ $\gg p_3 = \text{input}(x_1, y_2)$ $\gg p_4 = \text{input}(x_2, y_2)$ $\gg w_{x1} = 1 - (cal_w - x_1)$ $\gg w_{x2} = cal_w - x_1$ $\gg w_{y1} = 1 - (cal_h - y_1)$ $\gg w_{y2} = cal_h - y_1$ In the above equation, o_val is a pixel value of an output image. That is, o_val denotes the pixel value of the image after interpolation is performed, which corresponds to o_val in FIG. 8 and reference number 700 in FIG. 20.

In the above equation, p1 to p4 are pixel values of an input image. That is, p1 to p4 denote the pixel values referenced when interpolation is performed. In this explanation, since bilinear interpolation is assumed, calculating pixel values at four points will be described.

In addition, w_x1 to w_y2 denote weight values determined based on pixel positions in the output image relative to pixel positions in the input image.

cal_h: cal_h denotes a position value of the output image in the Y direction for 'j' (current y position) based on to the ratio between h_input (the height of the input image) and h_output (the height of the output image), where 'h' is an abbreviation for height.

cal_w: cal_w denotes a position value of the output image in the X direction for 'i' (current x position) based on to the ratio between w_input (the width of the input image) and w_output (the width of the output image), where 'w' is an abbreviation for width.

In the following, the interpolation process will be described in more detail.

First, it is assumed that scaling is performed from 100 X 80 to 160 X 100. If a pixel value at (50, 36) in the output image needs to be calculated and if a process for finding the pixel positions: x1, x2, y1, and y2 to be referenced in the input image is involved, w_input: 100, h_input: 80, w_output: 160, h_output: 100, i: 50, j: 36 cal_h=36×80/100=28.8 cal_w=50×100/160=31.25 x1=31, x2=32, y1=28, y2=29 p1=pixel value at position (31, 28) in input image.

p2=pixel value at position (32, 28) in input image.

p3=pixel value at position (31, 29) in input image.

p4=pixel value at position (32, 29) in input image.

w_x1=1−(31.25−31)=0.75 w_x2=(31.25−31)=0.25 w_y1=1−(28.8−28)=0.2 w_y2=(28.8−28)=0.8

→w_x1 to w_y2 are weights based on a first-degree polynomial function based on distance due to the bilinear interpolation.

The result of the following calculation: o_val=(p1×0.75+p2×0.25)×0.2+(p3×0.75+p4×0.25)×0.8 becomes the pixel value at the position (50, 36) in the output image.

However, according to the present disclosure, when cal_h and cal_w are calculated, PosW is designed to be added as follows.

$$Cal_h = j \times \frac{h_{input}}{h_{output}} \times PosW$$

$$Cal_w = j \times \frac{w_{input}}{w_{output}} \times PosW$$

FIGS. 21A and 21B are diagrams to explain a process for calculating different distortion correction weights in consideration of the distance between the center point and the current pixel according to one aspect of the present disclosure.

As shown in FIG. 21A, a weight (PosW) is designed to increase as the distance from the center point increases.

An exemplary equation for calculating the weight (PosW) is illustrated at the top of FIG. 21B. As the current pixel position (i, j) moves further away from the center point (x, y), the weight (PosW) gradually increases or decreases.

Additionally, the following aspects may be implemented: an aspect in which multiple weights are interpolated on a point basis; and an aspect in which multiple weights are stored in the form of a LUT, all of which fall within the scope of the present disclosure.

Figures 22A, 22B:
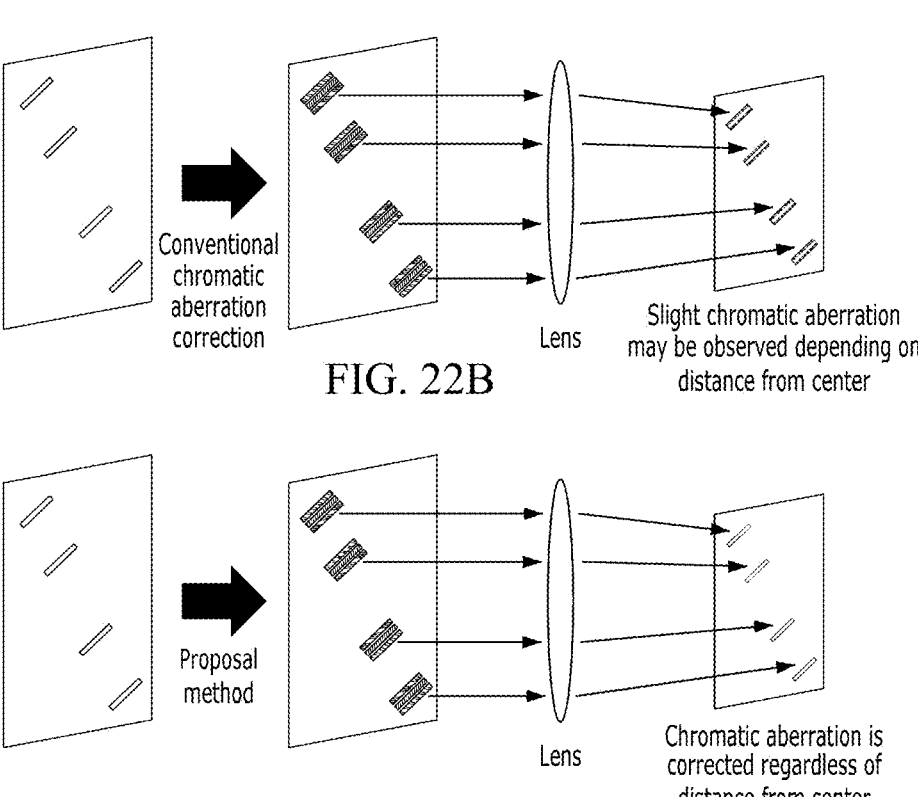
FIGS. 22A and 22B are diagrams to explain a process for calculating different distortion correction weights in consideration of the distance between the center point and the current pixel according to one aspect of the present disclosure.

FIGS. 22A and 22B are diagrams to explain a process for calculating different distortion correction weights in consideration of the distance between the center point and the current pixel according to one aspect of the present disclosure.

As shown in FIG. 22A, a weight (PosW) is designed to increase or decrease as the distance from the center point increases.

An exemplary equation for calculating the weight (PosW) is illustrated at the top of FIG. 22B. As the current pixel position (i, j) moves further away from the center point (x, y), the weight (PosW) gradually increases.

Additionally, the following aspects may be implemented: an aspect in which multiple weights are interpolated on a point basis; and an aspect in which multiple weights are stored in the form of a LUT, all of which fall within the scope of the present disclosure.

Figure 23:
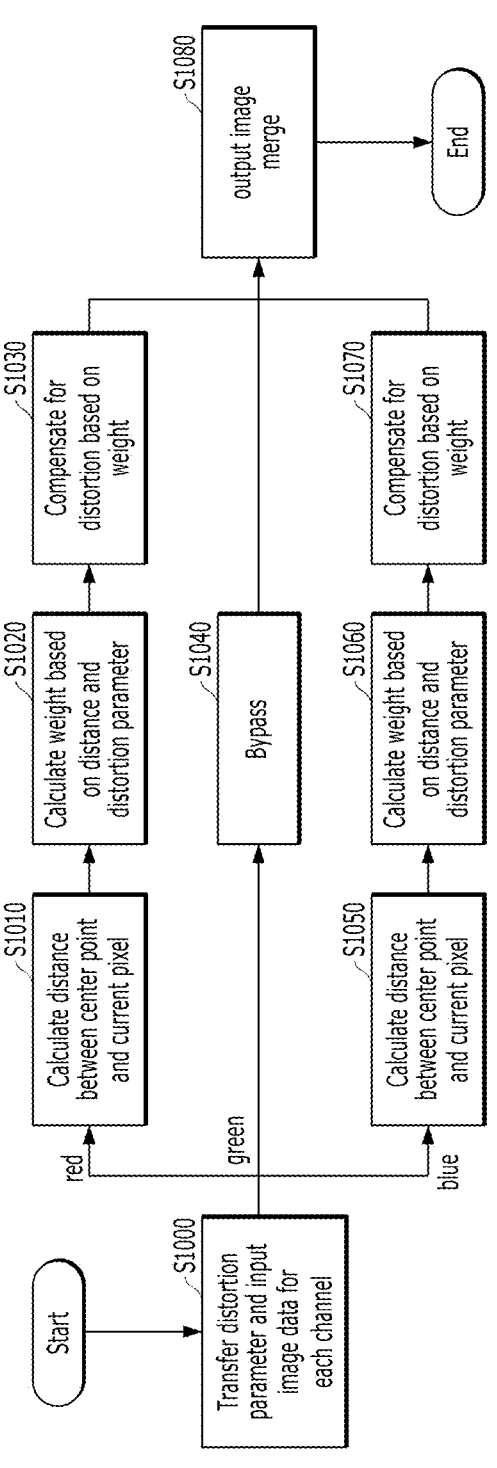
FIG. 23 is a flowchart of a method of providing VR services according to another aspect of the present disclosure.

FIG. 23 is a flowchart of a method of providing VR services according to another aspect of the present disclosure.

Input image data may be received together with a distortion parameter for each channel (e.g., R/G/B, etc.) (S1000). As described above, G pixels may be bypassed (S1040). However, the G pixels may also be processed if compensation is performed in consideration of sub-pixels.

On the other hand, for R pixels, the distance between the center point and the current pixel may be calculated (S1010), and a weight may also be calculated based on the distance and distortion parameter (S1020). Distortion compensation is designed to be performed based on to the calculated weight (S1030).

Additionally, for B pixels, the distance between the center point and the current pixel may be calculated (S1050), and a weight may also be calculated based on the distance and distortion parameter (S1060). Distortion compensation is designed to be performed based on to the calculated weight (S1070).

Furthermore, it is designed to synthesize the data for each compensated pixel and output the synthesized data (S1080).

The above operations will be described again from the perspective of a device providing VR services. First, the device stores a lens distortion parameter for chromatic aberration correction.

The device receives original image data and initially calculates the distance between the center point and the current pixel. Then, the device secondarily calculates a distortion correction weight based on the calculate distance.

Unlike the prior art, the device uses the calculated distortion correction weight to output image data at the current pixel, instead of using the lens distortion parameter stored in a memory as it is.

In particular, the secondary calculations (S1020 and S1060) are designed such that the distortion correction weight increase as the distance increases.

As shown in FIG. 21B, multiple distortion correction weights may be obtained based on an interpolation technique or a LUT.

It is emphasized once again that when the current pixel corresponds to a G pixel, the above-described steps: S1010, S1020, S1030, S1050, S1060, and S1070 are designed to be disabled.

Therefore, the center point in the following steps: S1010 and S1050 correspond to the center point of the distortion parameter for R pixels or the center point of the distortion parameter for B pixels.

At least one of the steps illustrated in FIG. 23 may also be designed to be performed, for example, by a DDI.

For example, an image processing device according to the present disclosure may be implemented in an IC, either individually for each component or by combining two or more components. The functionality of the image processing device may be implemented in programs and be embedded within the IC. When the functionality of the image processing device according to the present disclosure is implemented in programs, the functions of each component included in the image processing device are implemented with specific codes. The codes for implementing specific functions may be implemented in a single program. Alternatively, the codes may be split and implemented in multiple programs.

Referring to FIG. 13, the display driving method includes: receiving an image; calculating a distance between a current point and a current pixel for a sub-pixel of the image; calculating a weight based on a parameter; and compensating for distortion in the image based on the weight. A color of the sub-pixel may include at least one of R, G, or B, and the parameter may include at least one of a distance parameter, a distortion parameter, or a sub-pixel parameter.

With reference to FIGS. 10 and 11, the weight calculation will be described. Calculating the weight may include: generating a position weight based on a distance from the current pixel to a center point; generating a height and a width for the sub-pixel based on a degree to which the sub-pixel is distant from a center point of the sub-pixel along a specific axis, the position weight, a position of the sub-pixel, and a resolution ratio; generating a position of a pixel and a brightness level of the pixel based on the height and the width; and calculating a weight based on the position of the pixel, the height, and the width.

Referring to FIGS. 10 and 11, the sub-pixel may be B. The height may be generated based on a resolution ratio of the sub-pixel, a y-axis position of the sub-pixel, a position weight of the sub-pixel, and a degree to which the sub-pixel is deviated from a center point of a pixel including the sub-pixel along a y-axis. The width may be generated based on the resolution ratio of the sub-pixel, an x-axis position of the sub-pixel, the position weight of the sub-pixel, and a degree to which the sub-pixel is deviated from the center point of the pixel including the sub-pixel along an x-axis.

Referring to FIGS. 10 and 11, a decimal point of the height may be rounded down, and a decimal point of the width may be rounded down. Four surrounding (or nearby) coordinate values may be generated based on the rounded-down height and the rounded-down width. A weight for the B sub-pixel may be generated based on the four coordinate values, the height, and the width. A compensation value for the B sub-pixel may be generated based on the weight and pixel values of the four coordinate values.

Referring to FIG. 5, the display driving method may be performed by a display driving device. The display driving device includes: a position calculator configured to receive an image and calculate a distance between a current point and a current pixel for a sub-pixel of the image; a weight calculator configured to calculate a weight based on a parameter; and a distortion correction calculator configured to compensate for distortion in the image based on the weight. A color of the sub-pixel may include at least one of R, G, or B, and the parameter may include at least one of a distance parameter, a distortion parameter, or a sub-pixel parameter. The display driving device may include a memory and a processor.

The display driving method may be performed by a VR device including a display driving device. The VR device includes a lens, wherein the display driving device is connected to the lens. The display driving device includes: a position calculator configured to receive an image and calculate a distance between a current point and a current pixel for a sub-pixel of the image; a weight calculator configured to calculate a weight based on a parameter; and a distortion correction calculator configured to compensate for distortion in the image based on the weight. A color of the sub-pixel may include at least one of R, G, or B, and the parameter may include at least one of a distance parameter, a distortion parameter, or a sub-pixel parameter.

Accordingly, it is possible to compensate for color artifacts caused by the sub-pixel structure of a display in devices that provide images to users through special lenses. If the relative positions of sub-pixels within a single pixel, that is, distance information at which the sub-pixels are placed based on the center position of the pixel, are used as parameters in the algorithm for compensating for distortion, color artifacts may be compensated for.

The aspects have been described from the perspectives of the method and/or device, and the description of the method and device may be mutually complementary and applicable.

While each drawing has been explained separately for the sake of clarity, it is also possible to design new aspects by combining the aspects illustrated in each drawing. Designing a computer-readable recording medium having recorded thereon a program for executing the above-described aspects as needed by an ordinary skilled person falls within the scope of the present disclosure. The device and method according to the aspects are not limited to the configurations and methods in the above-described aspects. Instead, the aspects may be selectively combined in whole or in part to allow for various modifications. While various aspects of the present disclosure have been illustrated and explained, the present disclosure is not limited to the specific aspects described above. In addition, those skilled in the art will appreciate that various modifications may be made in the aspects without departing from the essence of the aspects claimed in the claims. These variations should not be individually understood apart from the technical concept or perspective of the aspects.

Various components of the device according to the aspects may be implemented by hardware, software, firmware, or a combination thereof. Various components of the aspects may be implemented as a single chip such as a hardware circuit, for example. According to aspects, the components of the aspects may be implemented as separate chips. According to aspects, at least one or more of the components of the device according to the aspects may include one or more processors capable of executing one or more programs. The one or more programs may perform one or more of the operations/methods according to aspects or include instructions for performing the same. Executable instructions for performing the methods/operations of the device according to the aspects may be stored in a non-transitory computer-readable medium (CRM) or other computer program products configured to be executed by the one or more processors. Alternatively, the instructions may be stored in a transitory CRM or other computer program products configured to be executed by the one or more processors. The concept of memory according to aspects may encompass not only a volatile memory (e.g., random-access memory (RAM)) but also a non-volatile memory, a flash memory, a programmable read-only memory (PROM), and the like. The memory may also be implemented in the form of carrier waves, such as transmission over the Internet. Furthermore, a processor-readable recording medium may be distributed to computer systems connected over a network, where processor-readable code may be stored and executed in a distributed manner.

In this document, "/" and "," are interpreted as "and/or." For example, "A/B" is interpreted as "A and/or B," and "A, B" is interpreted as "A and/or B." In addition, "A/B/C" means "at least one of A, B, and/or C." Similarly, "A, B, C" also means "at least one of A, B, and/or C." Furthermore, "or" is interpreted as "and/or." For example, "A or B" may mean: 1) "A" only, 2) "B" only, or 3) "A and B." In other words, "or" in this document may mean "additionally or alternatively."

Terms such as "first" and "second" may be used to describe various components of the aspects. However, the various components according to the aspects should not be limited by the interpretation of these terms. These terms are merely used to distinguish one component from another. For example, a first user input signal and a second user input signal are both user input signals, but unless clearly indicated in context, the first user input signal and second user input signal do not refer to the same user input signals.

The terms used to describe the aspects are used for the purpose of describing specific aspects. In other words, the terms are not intended to limit the aspects. As described in the aspects and claims, the singular form is intended to encompass the plural unless explicitly specified in context. The "and/or" expression is used to mean all possible combinations of terms. The terms such as "includes" or "comprises" are used to describe the presence of features, numbers, steps, elements, and/or components and does not imply the exclusion of additional features, numbers, steps, elements, and/or components. Condition expressions such as "if" and "when" used to describe aspects are not limited to optional cases but are intended to be interpreted to mean that when specific conditions are satisfied, related operations or definitions are performed or interpreted.

The operations according to aspects described in this document may be performed by a transmitting/receiving device, which includes a memory and/or a processor according to aspects. The memory may store programs for performing/controlling the operations according to the aspects, and the processor may control various operations described in this document. The processor may also be referred to as a controller. The operations according to the aspects may be performed by firmware, software, and/or a combination thereof. The firmware, software, and/or combination thereof may be stored in the processor or memory.

On the other hand, the operations according to the aspects may also be performed by a transmitting device and/or a receiving device according to aspects. The transmitting/receiving device may include a transceiver for transmitting and receiving media data, a memory for storing instructions (e.g., program code, algorithms, flowcharts, and/or data) for processes according to aspects, and a processor for controlling the operations of the transmitting/receiving device.

The processor may be referred to as a controller. The processor may correspond to hardware, software, and/or a combination thereof. The operations according to the aspects may be performed by the processor. Additionally, the processor may be implemented as an encoder/decoder for the operations according to the aspects.

Hereinabove, the best mode for implementing the aspects has been described.

As described above, the aspects may be applied entirely or partially to a display driving device and display method.

Those skilled in the art may make various modifications or variations to the aspects without departing from the scope of the present disclosure. The aspects may include modifications/variations without departing from the scope of the claims and their equivalents.

What is claimed is:

1. A display driving method comprising:
receiving an image;
calculating a distance between a current point and a current pixel for a sub-pixel of the image, wherein the current point is a center point of a display driving device and the current pixel is a pixel included in the received image;
calculating a weighted value based on at least one of the distance, a distortion and the sub-pixel; and
compensating for the distortion in the image based on the weighted value,
wherein a color of the sub-pixel includes at least one of red, green and blue,
wherein the compensating for the distortion in the image is performed by interpolation based on scale ratios applied with different weighted values as the distance between the current point and the current pixel for the sub-pixel of the image increases, and
wherein the calculating the weighted value comprises:
generating a position weighted value based on the distance from the current pixel to the center point;
generating a height and a width for the sub-pixel based on an amount to which the sub-pixel is distant from the center point of a pixel including the sub-pixel along a specific axis, the position weighted value, a position of the sub-pixel, and resolution ratios in a vertical direction and a horizontal direction between an input image and an output image:
generating a position of a pixel and a brightness level of the pixel based on the height and the width; and
calculating the weighted value based on the position of the pixel, the height, and the width.

2. The display driving method of claim 1, wherein the sub-pixel is blue,
wherein the height is generated based on the display resolution of the sub-pixel, a y-axis position of the sub-pixel, the position weighted value of the sub-pixel, and an amount to which the sub-pixel is deviated from the center point of the pixel including the sub-pixel along a y-axis, and
wherein the width is generated based on the display resolution of the sub-pixel, an x-axis position of the sub-pixel, the position weighted value of the sub-pixel, and an amount to which the sub-pixel is deviated from the center point of the pixel including the sub-pixel along an x-axis.

3. The display driving method of claim 2, wherein a decimal point of the height is rounded down,
wherein a decimal point of the width is rounded down,
wherein four surrounding coordinate values are generated based on the rounded-down height and the rounded-down width,
wherein a weight for the blue sub-pixel is generated based on the four coordinate values, the height, and the width, and
wherein a compensation value for the blue sub-pixel is generated based on the weight and pixel values of the four coordinate values.

4. The display driving method of claim 1,
wherein the sub-pixel is included in a pixel,
wherein a first sub-pixel of red and a second sub-pixel are located along with a x axis in the pixel,
wherein a third sub-pixel of green and a fourth sub-pixel are located along with a y axis in the pixel,
wherein the first sub-pixel is located in a first distance from a center of the pixel, wherein the second sub-pixel is located in a second distance from a center of the pixel, wherein the third sub-pixel is located in a third distance from a center of the pixel, wherein the fourth sub-pixel is located in a fourth distance from a center of the pixel.

5. The display driving method of claim 4, wherein brightness for the pixel is locally interpolated with consideration of the location of the first sub-pixel, the second sub-pixel, the third sub-pixel, and the fourth sub-pixel.

6. The display driving method of claim 5, wherein when the pixel includes edge of an object displayed in a VR device, chromatic aberration of the pixel is corrected with consideration of the location of the first sub-pixel, the second sub-pixel, the third sub-pixel, and the fourth sub-pixel.

7. A display driving device comprising:

a position calculator configured to receive an image and calculate a distance between a current point and a current pixel for a sub-pixel of the image, wherein the current point is a center point of the display driving device and the current pixel is a pixel included in the received image;

a weight calculator configured to calculate a weighted value based on at least one of the distance, a distortion and the sub-pixel; and a distortion correction calculator configured to compensate for the distortion in the image based on the weighted value, wherein a color of the sub-pixel includes at least one of red, green, or blue, wherein the compensating for the distortion in the image is performed by interpolation based on scale ratios applied with different weighted values as the distance between the current point and the current pixel for the sub-pixel of the image increases, and wherein the weight calculator is configured to:

generate a position weighted value based on the distance from the current pixel to the center point;

generate a height and a width for the sub-pixel based on an amount to which the sub-pixel is distant from the center point of a pixel including the sub-pixel along a specific axis, the position weighted value, a position of the sub-pixel, and resolution ratios in a vertical direction and a horizontal direction between an input image and an output image;

generate a position of a pixel and a brightness level of the pixel based on the height and the width; and calculate the weighted value based on the position of the pixel, the height, and the width.

8. The display driving device of claim 7, wherein the sub-pixel is blue, wherein the height is generated based on the display resolution of the sub-pixel, a y-axis position of the sub-pixel, the position weighted value of the sub-pixel, and an amount to which the sub-pixel is deviated from the center point of the pixel including the sub-pixel along a y-axis, and wherein the width is generated based on the display resolution of the sub-pixel, an x-axis position of the sub-pixel, the position weighted value of the sub-pixel, and an amount to which the sub-pixel is deviated from the center point of the pixel including the sub-pixel along an x-axis.

9. The display driving device of claim 8, wherein a decimal point of the height is rounded down, wherein a decimal point of the width is rounded down, wherein four surrounding coordinate values are generated based on the rounded-down height and the rounded-down width, wherein a weight for the blue sub-pixel is generated based on the four coordinate values, the height, and the width, and wherein a compensation value for the blue sub-pixel is generated based on the weight and pixel values of the four coordinate values.

10. The display driving device of claim 7, wherein the sub-pixel is included in a pixel, wherein a first sub-pixel of red and a second sub-pixel are located along with a x axis in the pixel, wherein a third sub-pixel of green and a fourth sub-pixel are located along with a y axis in the pixel, wherein the first sub-pixel is located in a first distance from a center of the pixel, wherein the second sub-pixel is located in a second distance from a center of the pixel, wherein the third sub-pixel is located in a third distance from a center of the pixel, wherein the fourth sub-pixel is located in a fourth distance from a center of the pixel.

11. The display driving device of claim 10, wherein brightness for the pixel is locally interpolated with consideration of the location of the first sub-pixel, the second sub-pixel, the third sub-pixel, and the fourth sub-pixel.

12. The display driving device of claim 11, wherein when the pixel includes edge of an object displayed in a VR device, chromatic aberration of the pixel is corrected with consideration of the location of the first sub-pixel, the second sub-pixel, the third sub-pixel, and the fourth sub-pixel.

13. A virtual reality (VR) device comprising:

a lens; and a display driving device connected to the lens, wherein the display driving device comprises:

a position calculator configured to receive an image and calculate a distance between a current point and a current pixel for a sub-pixel of the image, wherein the current point is a center point of the display driving device and the current pixel is a pixel included in the received image;

a weight calculator configured to calculate a weighted value based on at least one of the distance, a distortion and the sub-pixel; and a distortion correction calculator configured to compensate for the distortion in the image based on the weight, wherein a color of the sub-pixel includes at least one of red, green, or blue, wherein the compensating for the distortion in the image is performed by interpolation based on scale ratios applied with different weighted values as the distance between the current point and the current pixel for the sub-pixel of the image increases, and wherein the weight calculator is configured to:

generate position weighted value based on the distance from the current pixel to the center point;

generate a height and a width for the sub-pixel based on an amount to which the sub-pixel is distant from the center point of a pixel including the sub-pixel along a specific axis, the position weighted value, a position of the sub-pixel, and resolution ratios in a vertical direction and a horizontal direction between an input image and an output image;

generate a position of a pixel and a brightness level of the pixel based on the height and the width; and calculate the weighted value based on the position of the pixel, the height, and the width.

14. The VR device of claim 13, wherein the sub-pixel is blue, wherein the height is generated based on the display resolution of the sub-pixel, a y-axis position of the sub-pixel, the position weighted value of the sub-pixel, and an amount to which the sub-pixel is deviated from the center point of the pixel including the sub-pixel along a y-axis, and wherein the width is generated based on the display resolution of the sub-pixel, an x-axis position of the sub-pixel, the position weighted value of the sub-pixel, and an amount to which the sub-pixel is deviated from the center point of the pixel including the sub-pixel along an x-axis.

15. The VR device of claim 14, wherein a decimal point of the height is rounded down, wherein a decimal point of the width is rounded down, wherein four surrounding coordinate values are generated based on the rounded-down height and the rounded-down width, wherein a weight for the blue sub-pixel is generated based on the four coordinate values, the height, and the width, and wherein a compensation value for the blue sub-pixel is generated based on the weight and pixel values of the four coordinate values.

16. The VR device of claim 13, wherein the sub-pixel is included in a pixel, wherein a first sub-pixel of red and a second sub-pixel are located along with a x axis in the pixel, wherein a third sub-pixel of green and a fourth sub-pixel are located along with a y axis in the pixel, wherein the first sub-pixel is located in a first distance from a center of the pixel, wherein the second sub-pixel is located in a second distance from a center of the pixel, wherein the third sub-pixel is located in a third distance from a center of the pixel, wherein the fourth sub-pixel is located in a fourth distance from a center of the pixel.

17. The VR device of claim 16, wherein brightness for the pixel is locally interpolated with consideration of the location of the first sub-pixel, the second sub-pixel, the third sub-pixel, and the fourth sub-pixel.

* * * * *